United States Patent
Rahamim et al.

(10) Patent No.: US 7,583,797 B2
(45) Date of Patent: Sep. 1, 2009

(54) SINGLE ENDED ANALOG FRONT END

(75) Inventors: Raphael Rahamim, Orange, CA (US); Daniel Marz, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 750 days.

(21) Appl. No.: 09/901,558

(22) Filed: Jul. 10, 2001

(65) Prior Publication Data

US 2002/0097863 A1  Jul. 25, 2002

Related U.S. Application Data

(60) Provisional application No. 60/236,520, filed on Sep. 29, 2000, provisional application No. 60/217,127, filed on Jul. 10, 2000.

(51) Int. Cl.
 *H04M 1/00* (2006.01)
(52) U.S. Cl. .................. 379/399.01; 379/399.02
(58) Field of Classification Search ........... 379/399.01, 379/413.04, 398, 388.01, 399.02
See application file for complete search history.

(56) References Cited

U.S. PATENT DOCUMENTS

| | | | |
|---|---|---|---|
| 4,178,482 A * | 12/1979 | Ouellette | 370/201 |
| 4,224,470 A | 9/1980 | Persson et al. | |
| 4,536,888 A | 8/1985 | Wilson | |
| 4,554,608 A | 11/1985 | Block | |
| 4,852,444 A * | 8/1989 | Hoover et al. | 84/738 |
| 5,053,910 A | 10/1991 | Goldstein | |
| 5,614,864 A * | 3/1997 | Stubbe et al. | 330/69 |
| 5,793,265 A | 8/1998 | Spielman | |
| 6,198,818 B1 | 3/2001 | Bingel | |
| 6,226,322 B1 | 5/2001 | Mukherjee | |
| 6,252,755 B1 | 6/2001 | Willer | |
| 6,295,323 B1 * | 9/2001 | Gabara | 375/257 |
| 6,385,253 B1 * | 5/2002 | Swisher | 375/259 |
| 6,400,772 B1 * | 6/2002 | Chaplik | 375/258 |
| 6,526,429 B1 * | 2/2003 | Lai et al. | 708/300 |
| 6,618,480 B1 * | 9/2003 | Polley et al. | 379/406.05 |
| 6,621,346 B1 * | 9/2003 | Nabicht et al. | 330/284 |
| 6,646,489 B1 * | 11/2003 | Tchagaspanian | 327/427 |
| 6,760,434 B1 * | 7/2004 | Rezvani et al. | 379/402 |
| 6,801,621 B1 * | 10/2004 | Tennen et al. | 379/345 |
| 2001/0036261 A1 * | 11/2001 | Prendergast et al. | 379/398 |
| 2002/0064220 A1 | 5/2002 | Yamano et al. | |

FOREIGN PATENT DOCUMENTS

WO  WO 99/53661  10/1999
WO  WO 99/66683  12/1999

OTHER PUBLICATIONS

European Search Report issued Oct. 17, 2006 for Appl. No. EP 01250255, 5 pages.

* cited by examiner

*Primary Examiner*—Md S Elahee
(74) *Attorney, Agent, or Firm*—Sterne, Kessler, Goldstein & Fox, PLLC

(57) ABSTRACT

An analog front end. The analog front end comprises a converter configured to convert a differential input signal to a single-ended input signal, and convert a single-ended output signal to a differential output signal. And a transformer configured to couple the differential input signal from a twisted pair telephone line to the converter, and couple the differential output signal from the converter to the twisted pair telephone line.

45 Claims, 17 Drawing Sheets

Single Ended CO AFE xDSL CARD for CO

SINGLE ENDED ANALOG FRONT END

CROSS-REFERENCE TO RELATED APPLICATION(S)

This application claims the benefit of U.S. Provisional Patent Application No. 60/217,127 filed Jul. 10, 2000 and U.S. Provisional Application No. 60/236,520 filed on Sep. 29, 2000, the contents of which are hereby incorporated by reference.

BACKGROUND OF THE INVENTION

Analog front ends (AFES) play a key role in a number of applications which utilize an interface between a phone line and a digital processor. Typically any one of the digital subscriber line (xDSL) modems available utilize analog front end (AFE) circuits to connect a digital subscriber line (DSL, or more generally xDSL) circuits to an analog telephone line. An xDSL signal is one of the many available digital subscriber line signals that are applicable to the disclosure presented below. In transmitting a DSL signal from the modem onto the telephone line, digital to analog converter (DAC) circuits disposed in digital subscriber line (DSL) modem's interface to an analog telephone line carrying analog signals. In a DSL modem receiving an analog signal from a telephone line, analog to digital converter (ADC) circuits disposed in digital subscriber line (DSL) modem's interface to an analog telephone line carrying analog signals.

In typical DSL modem circuits DAC outputs drive "balanced" analog phone lines "differentially". Also, analog signals received from the analog telephone line, by the modem are received "differentially" by "balanced" circuits. Typically circuits are "single ended" rather than "balanced" due to the added complexity of adding an extra parts utilized in balanced circuits. Balanced circuits utilize two signal carrying conductors and a ground conductor. Single ended circuits utilize a single signal carrying conductor and a ground conductor. Typically a balanced signal is transformed into a single ended signal after reception and initial processing in which the signal strength is typically improved.

Voice band modems (such as those built under the v.90 standard described in the International Telecommunications Union ITU v.90 standard for providing digital communications between computers via twisted pair telephone lines are well known. Voice band modems are commonly used to provide Internet access by facilitating digital communications between personal computers and Internet Service Providers (ISPs).

Due to the increasingly large quantity of digital data being communicated via twisted pair telephone lines, the maximum bit rate associated with voice band modems is frequently considered inadequate. The comparatively slow speed of voice band modems is a severe limitation when transferring large binary files such as images, film clips, audio, large data files and the like.

The increasing popularity of such communication services as video on demand (pay-per-view), realtime video teleconferencing and high speed Internet access has further increased the need for higher data rates over twisted pair telephone lines. Digital subscriber line (DSL) provides a way of facilitating digital communications over twisted pair telephone lines at data rates in excess of 1.5 Mbps, so as to facilitate such desirable services.

DSL utilizes an advanced modulation scheme known as quadrature amplitude modulation (QAM), wherein a combination of amplitude and phase modulation is used to encode digital information for transmission over twisted pair copper telephone lines. Although QAM provides a substantial increase in bit rate, as compared with earlier modulation schemes such as those which are utilized in contemporary voice band modems, it is still desirable to optimize the bit rate provided by QAM, so as to provide digital communications at the highest possible speed while maintaining the desired quality of service.

One problem which inhibits optimization of the bit rate in DSL installations is radio frequency ingress (RFI). RFI occurs when the twisted pair copper wires of a DSL installation function as a radio antenna at the frequencies upon which the DSL transceivers communicate. Conventional DSL transceivers include balanced analog front ends for common mode rejection of RFI. However, balanced front ends often increase complexity and cost. Balanced AFEs are thought to provide the cleanest means for signal transmission between the telephone line and the DACs and ADCs of the DSL modem. Balanced AFEs typically keep a noise floor associated with a transmitted signal down to a minimum. Balanced AFEs typically use double the number of parts a single ended AFE would consume, but tend to minimize undesirable noise present in the noise floor. Additionally, active parts typically utilized in an a balanced AFE to improve signal quality typically consume more power than their single ended counterparts. Accordingly, an unbalanced analog front end with RFI rejection is desirable.

SUMMARY OF THE INVENTION

The present invention therefore provides an analog front end, comprising a converter including a transformer configured to convert a differential input signal to a single-ended input signal, and convert a single-ended output signal to a differential output signal. The convertor also provides isolation between the AFE and analog telephone line. The transformer is configured to couple the differential input signal from a twisted pair telephone line to the converter, and couple the differential output signal from the converter to the twisted pair telephone line.

Many of the attendant features of this invention will be more readily appreciated as the same becomes better understood by reference to the following detailed description considered in connection with the accompanying drawings.

BRIEF DESCRIPTION OF THE DRAWINGS

These and other features and advantages of the present invention will be better understood from the following detailed description read in light of the accompanying drawings, wherein: SINGLE ENDED ANALOG FRONT END

Like reference numerals are used to designate like parts in the accompanying drawings.

DETAILED DESCRIPTION OF THE INVENTION

Single Ended Analog Front End

Analog Front Ends utilizing low cost components, and technical approaches that yield a low unit cost are utilized in DSL service applications. An analog front end (AFE) typically serves as an interface between a twisted pair transmission line and a DSL transceiver. In the examples provided below unshielded twisted pair transmission lines are disclosed. However, those skilled in the art will readily appreciate that any type of balanced transmission line such as shielded twisted pair, or unshielded twisted pair may be utilized as a twisted pair transmission line to transmit balanced signals.

Figure 1A:
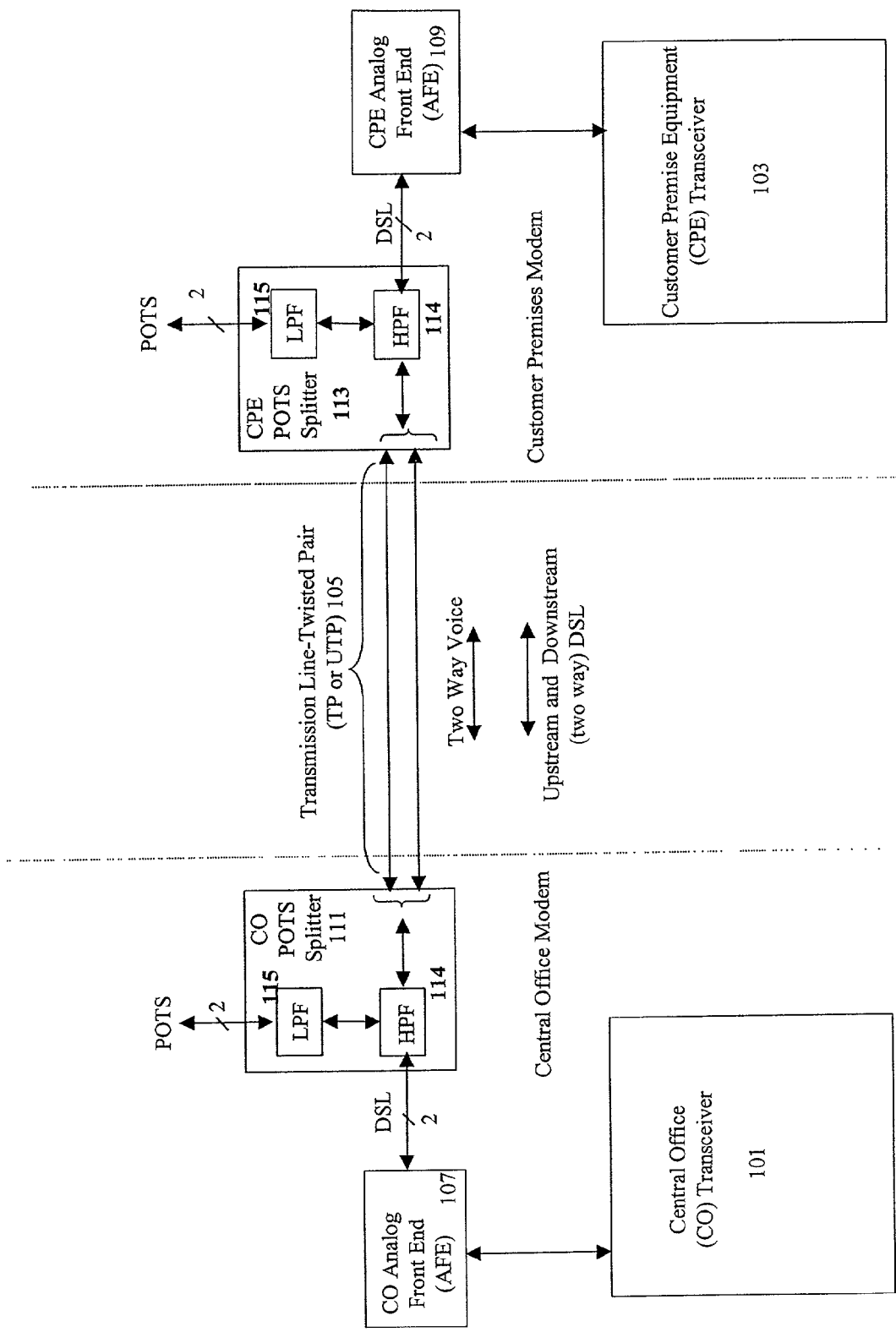
FIG. 1a is a block diagram showing a pair of analog front ends in a typical central office (CO) and customer premise equipment (CPE) configuration.

FIG. 1*a* is a block diagram showing a pair of analog front ends 107, 109 as utilized in DSL modems in a typical central office (CO) and customer premise equipment (CPE) configurations. A central office transceiver (CO) 101 is coupled to a customer premise equipment (CPE) transceiver 103 by a twisted pair (TP) transmission line 105. The twisted pair is a balanced transmission line that typically couples a conventional plain old telephone system (POTS) splitter 111, located in the central office transceiver 101 to an identically constructed POTS splitter 113 located with the customer premise equipment transceiver 103.

The POTS splitter 111 located in the central office transceiver interfaces with the central office transceiver 101 through a central office (CO) analog front end (AFE) 107. At the customer premise equipment transceiver location 103 the POTS splitter 113 interfaces with the customer premise equipment transceiver 103 through a customer premise equipment (CPE) analog front end (AFE) 109. Typically the CO analog front end and the CPE analog front end function identically. However, the CO AFE is configured to utilize high pass filter topology to handle up stream DSL signals and the CPE AFE is configured with low pass filter topology to process down stream DSL communications.

The twisted pair 105 is typically a twisted pair of conductors that provide a controlled impedance connection to transmit balanced signals that typically includes two way voice signals and simultaneous up stream and down stream DSL signals. Depending upon system noise requirements a shield may, or may not be utilized. The central office transceiver 101 is typically located several hundred yards or more away from the user in a telephone equipment facility such as a switching office. The customer premise equipment transceiver is typically located in close proximity to the customer. A typical installation would have the customer premise equipment transceiver located in a telecommunications closet or room in the same building as that of a customers' DSL transmission and reception equipment. (such as a cable modem).

Impedance matching resistor R is often included in a 2 to 4 wire hybrid circuit 218, as well as an isolation transformer 201. A 2 to 4 wire hybrid circuit makes full duplex communications over a telephone circuit possible.

A POTS 111, 113 splitter is not necessarily disposed on the analog front end circuit board 107, 109. It may be disposed at any convenient location and coupled to the analog front end by a wired connection. In a POTS splitter 111 such as the one disposed at the central office 111 or the POTS splitter disposed at the customer premises 113 a high pass filter 114 allows a DSL signal disposed at frequencies above the cutoff frequency of high pass filter 114 to pass to the central office analog front end 107. A low pass filter 115 allows plain old telephone signals to pass to other central office equipment such as telephone sets. At the customer premise equipment side, the high pass filter 114 allows DSL signals to pass to the customer premise equipment analog front end 109 and a low pass filter 115 allows plain old telephone signals to pass to telephone sets coupled to the POTS splitter 113. In the embodiment shown, the low pass filter allows POTS signals to pass. Those skilled in the art will realize that other types of signals could be passed through the low pass filter other than plain old telephone signals. In a typical POTS splitter the inputs and outputs are typically balanced signals utilizing two conductors to carry the signal plus a ground signal conductor. A transformer may be used at some point in the circuit to convert a balanced input signal to a single ended signal. However, this is typically not done since conventional circuit design methodology typically would lead one to maintain a balanced circuit to process a weak signal in the presence of noise. A transformer for converting a balanced signal to a single ended signal is termed a balun transformer.

Figure 1B:
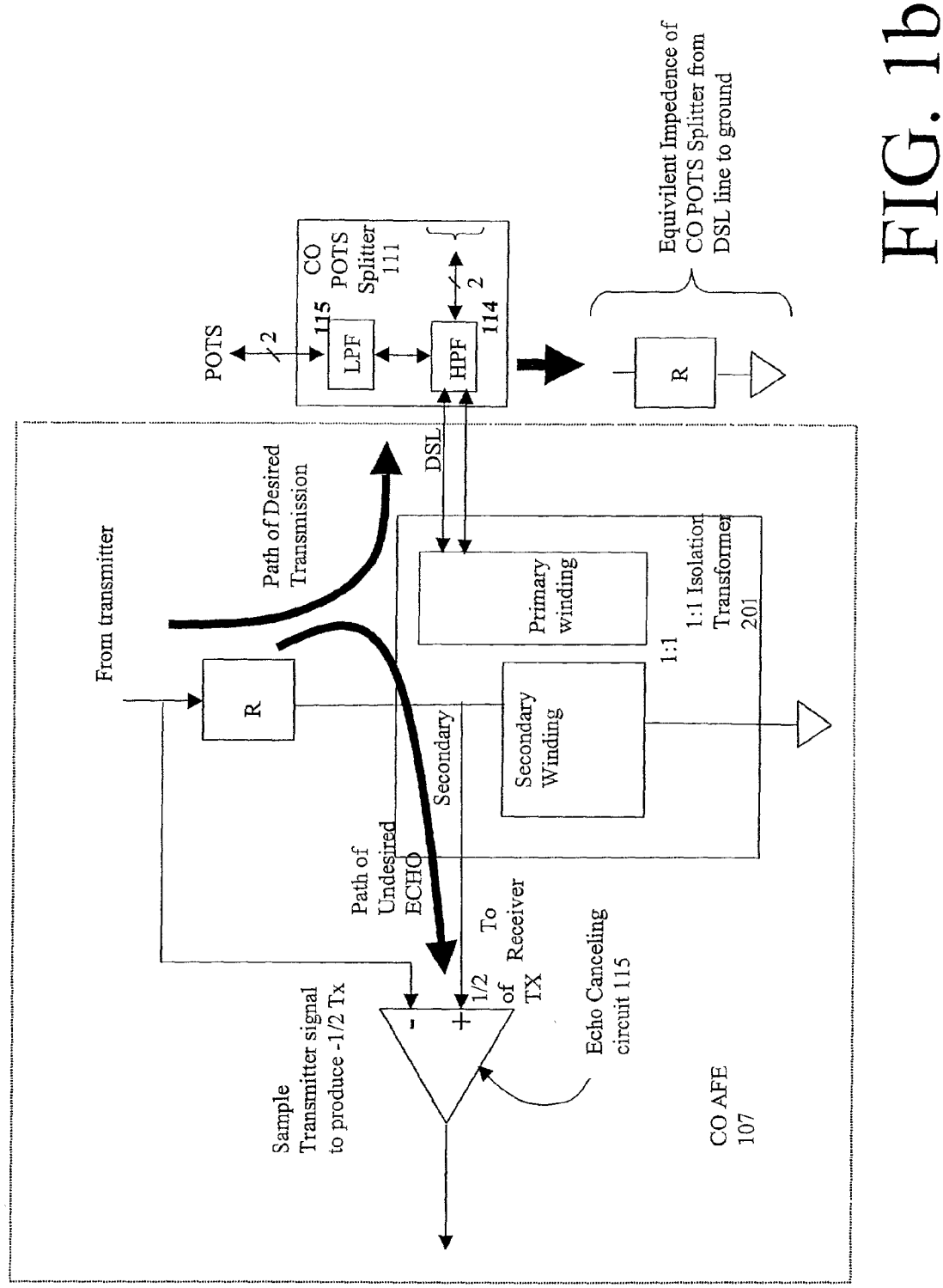
FIG. 1b is an illustration of a co-POTS splitter 111 used in conjunction with an isolation transformer 201 and impedance matching resistor R.

FIG. 1*b* is an illustration of a co-POTS splitter 111 used in conjunction with an isolation transformer 201 and impedance matching resistor R. If an isolation transformer were used alone, its two windings of the secondary provide a receive and transmit path coupled to the primary, then a transmitted signal would be heard equally strong at the receiver. This creates an undesirable side tone level in an ear of a person who is talking over a telephone circuit. However, it is desirable to maintain a small amount of side tone level such that a person transmitting is provided a degree of feedback to help them maintain their voice at a level comfortable for a listener at the receiving end of the telephone conversation.

In the isolation transformer 201 the secondary is supplied with one winding. The first winding has a first end coupled to the receiver and a second end coupled to ground. The first winding also has a first terminal coupled to the transmitter impedance matching resistor R and the second terminal coupled to ground. In a 1 to 1 tuns ratio transformer an impedance coupled across the primary is reflected across the secondary proportional to the tuns ratio. For a 1:1 tuns ratio, the same impedance is seen across the secondary terminals as across the primary terminals. In the instant case an impedance R of 100 ohms is the equivalent impedance to ground of the CO POTS splitter 111. Thus, the 100 ohms impedance of the CO POTS splitter 111 is seen as a 100 ohm impedance across the secondary to ground. By selecting impedance matching resistor R to be 100 ohms for maximum power transfer the result is that half of the transmitted signal generated at the CO modem's transmitter is reflected back as an inherent echo into the CO receiver. It is desirable to cancel this echo.

To reduce the inherent echo an echo cancellation circuit 115 is utilized. A received signal is applied to a positive input of an echo cancelling circuit. The signal applied at the positive input of the echo cancellation circuit includes the echo that has a value of one half the transmitted signal. The transmitter output is sampled by conventional methods known to those skilled in the art and applied to an echo cancelling circuit such that the signal having a negative of typically one-half the transmitter signal is applied to the echo cancelling circuit. Thus, at the output of the echo cancelling circuit the echo is cancelled. With the echo cancelling circuit, set-up distortion is also cancelled. The distortion path is the same as that of the echo causing the distortion to be cancelled as well as the echo.

Figure 2:
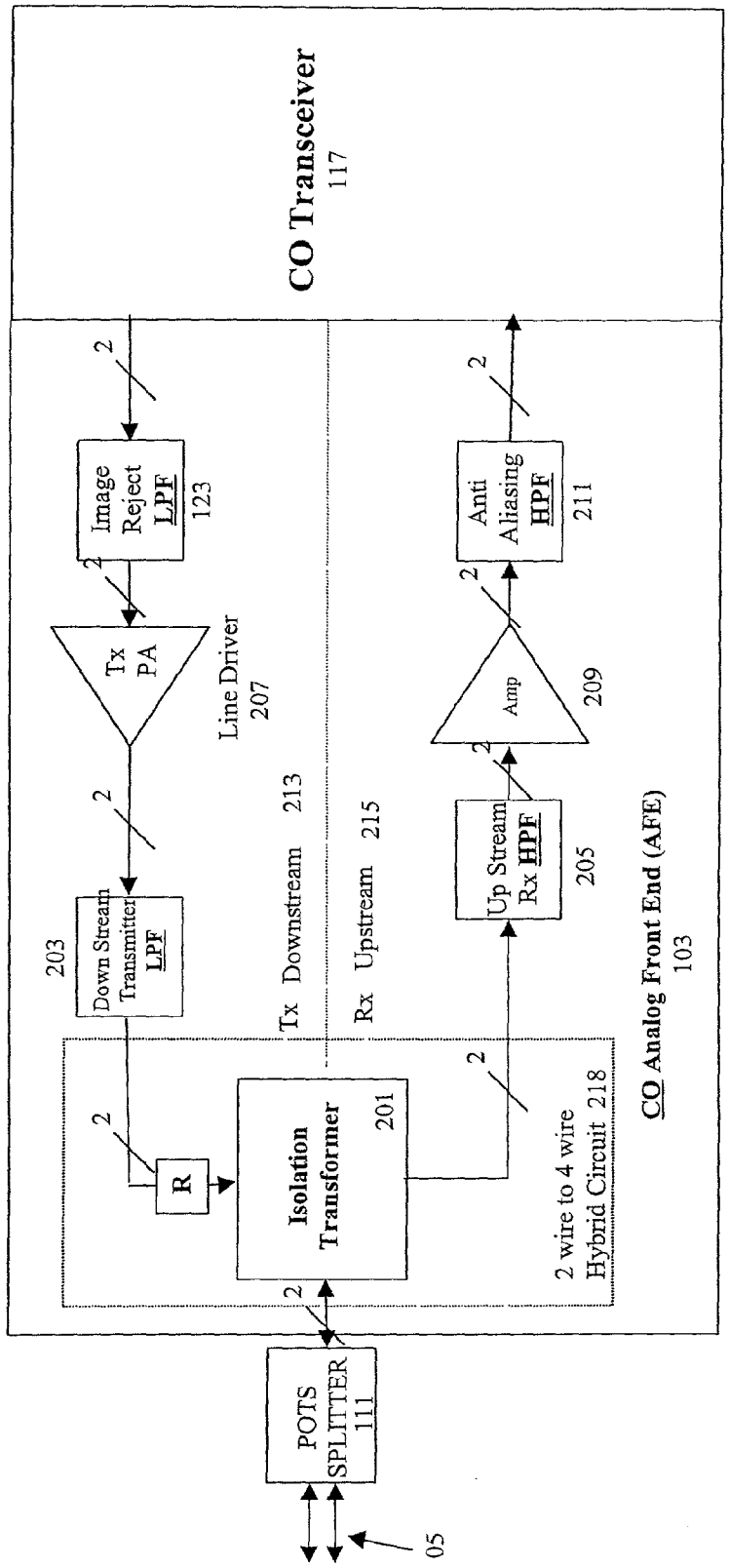
FIG. 2 is a block diagram of a typical balanced CO AFE.

FIG. 2 is a block diagram of a typical balanced central office analog front end (CO AFE) 103. An analog front 103 end typically conditions a signal received from a transmission source such as a Balanced transmission line 105. Signals transmitted over a transmission line typically vary greatly in amplitude and have noise introduced onto the line, typically because of the great distances a signal travels to reach the analog front end. A typical analog front end is constructed to reject noise present on the transmission line 105 and condition a desired signal so that it is neither too strong, nor too weak for subsequent processing in a co-transceiver 117. It is typically desirable to amplify a signal that is too weak for processing by a amplifier 209 in the analog front end. Conversely, if the signal is too strong it is desirable for the analog front end to attenuate the signal such that the receiver may process the signal without being driven to distortion by a signal that is too strong. It is desirable to amplify the weak signal so that the receiver may distinguish it from the ambient noise typically present in a receiver or added as is typically occurs in the transmission line 105. Analog front ends typically use balanced circuits that used by standard engineering practice to generate less noise and less distortion and to reject common mode noise that is often present on twisted pair transmission lines 105. The Balanced transmission lines are indicated by the connecting lines in the figure that have a hash mark with a number 2 above the hash mark.

A typical central office analog front end is divided into two functional parts 213, 215 that process a received 215 and transmitted 213 signal. The Tx amplifier and filter circuitry 213 processes signals from the transceiver 117 for subsequent transmission onto transmission line 105. The Rx amplifier and filter circuitry 215 typically processes signals received from transmission line 105 prior to presentation to the transceiver 117. Transmitted and received signals are simultaneously present on transmission line 105. A conventional POTS splitter 111 separates the transmitted voice, ISDN and DSL signals. Alternatively, as will be appreciated by those skilled in the art, a POTs splitter may be used to separate VDSL and ISDN or VDSL and POTS, or other signals present on an analog telephone line. The splitter 111 and the isolation transformer 201 are shown separate from one another. However, the POTS splitter at 111 and the isolation transformer 201 may equivalently be incorporated to a single unit. Also, the impedance matching resistor R may be varied in value to provide varying degrees of matching as required in a system design.

A balanced transmission line 105 is coupled to the input of the POTS splitter 111 and has an output that is coupled to the input of an Isolation transformer 201. As is known to those skilled in the art, hybrid 201 may consist of an isolation transformer, coupled to a matching resistor to provide a 2:4 wire conversion of impedances. The Balanced outputs of the hybrid splitter has a first balanced output and the second balanced output. The first output of hybrid splitter 218 is coupled to an input of an up stream receiver high pass filter 205. An output of the up stream receiver low pass filter 205 is coupled to an input of an amplifier 209. An output of amplifier 209 is coupled to an input of anti-aliasing high pass filter 211. An output of the anti-aliasing high pass filter 211 is coupled to an up stream receive path input of the CO transceiver 117.

The second Balanced output of the 2:4 hybrid splitter 201 is coupled to an output of a down stream transmitter low pass filter 203 through an impedance matching resistor R. An input of the down stream transmitter high pass filter 203 is coupled to the output of a line driver 207. An input of line driver 207 is coupled to an output of an image reject low pass filter 123. An input of the image reject low pass filter is coupled to a down stream transmit path of the CO transceiver 117. As illustrated, all of the connections shown between components are typically provided with two conductors. Two conductors are utilized such that a balanced signal transmission system may be utilized. In a balanced signal transmission equal and opposite currents are imposed in each conductor of the balanced twisted pair transmission system.

In a typical conductor arrangement where noise is not a consideration a single conductor suspended over a ground plane is often used to form a single ended transmission line. In this arrangement circuitry is only required to process the signal present on single conductor. Thus, it can be seen that a balanced transmission system typically utilizes twice the parts count of a single ended transmission system. However, a conventional practice is to utilize balance with transmission systems because of their assumed inherent noise immunity properties.

Figure 3:
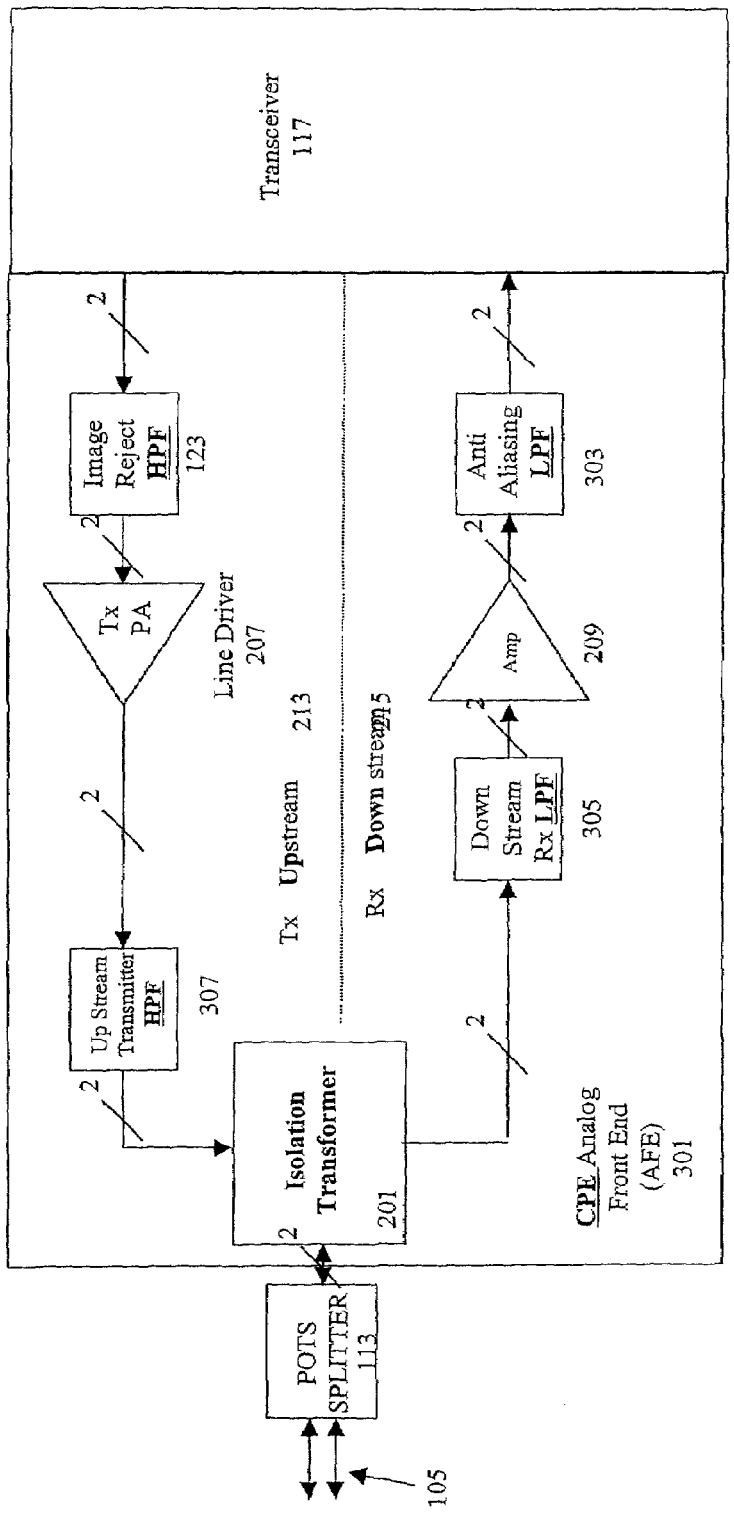
FIG. 3 is a block diagram of a typical balanced CPE AFE.

FIG. 3 is a block diagram of a typical balanced customer premise equipment analog front end (CPE AFE)301 At the customer premise location, a twisted pair line 105 is coupled to an input of a POTS splitter 111. A Balanced output of the POTS splitter 111 is coupled to an input a 2:4 hybrid 218. The hybrid 218 includes 2 Balanced outputs, a first Balanced output and a second Balanced output. The first balanced output feeds signals to a receiver down stream circuitry 215 that is part of the CPE AFE 301. The first output of isolation transformer 201 is coupled to an input of a down stream receiver low pass filter 305. An output of down stream low pass filter 305 is coupled to an input of an amplifier 209. An output of amplifier 209 is coupled to an input of an anti-aliasing low pass filter 303. An output of anti-aliasing low pass filter 303 is coupled to an up stream receiver path of the transceiver 117.

The second output of the isolation transformer 201 is coupled to an output of a up stream transmitter high pass filter 307. An input of down stream transmitter high pass filter 307 is coupled to an output of line driver 207. An input of line driver 207 is coupled to an output of an image-reject high pass filter 123. An input of image reject high pass filter 123 is coupled to a down stream transmitter path of the transceiver 103.

At the customer premise equipment location, transmission line 105 interfaces with a customer premise equipment analog front end (CPE AFE) 107 that in turn is coupled to the customer premise equipment transceiver 101.

Figure 4:
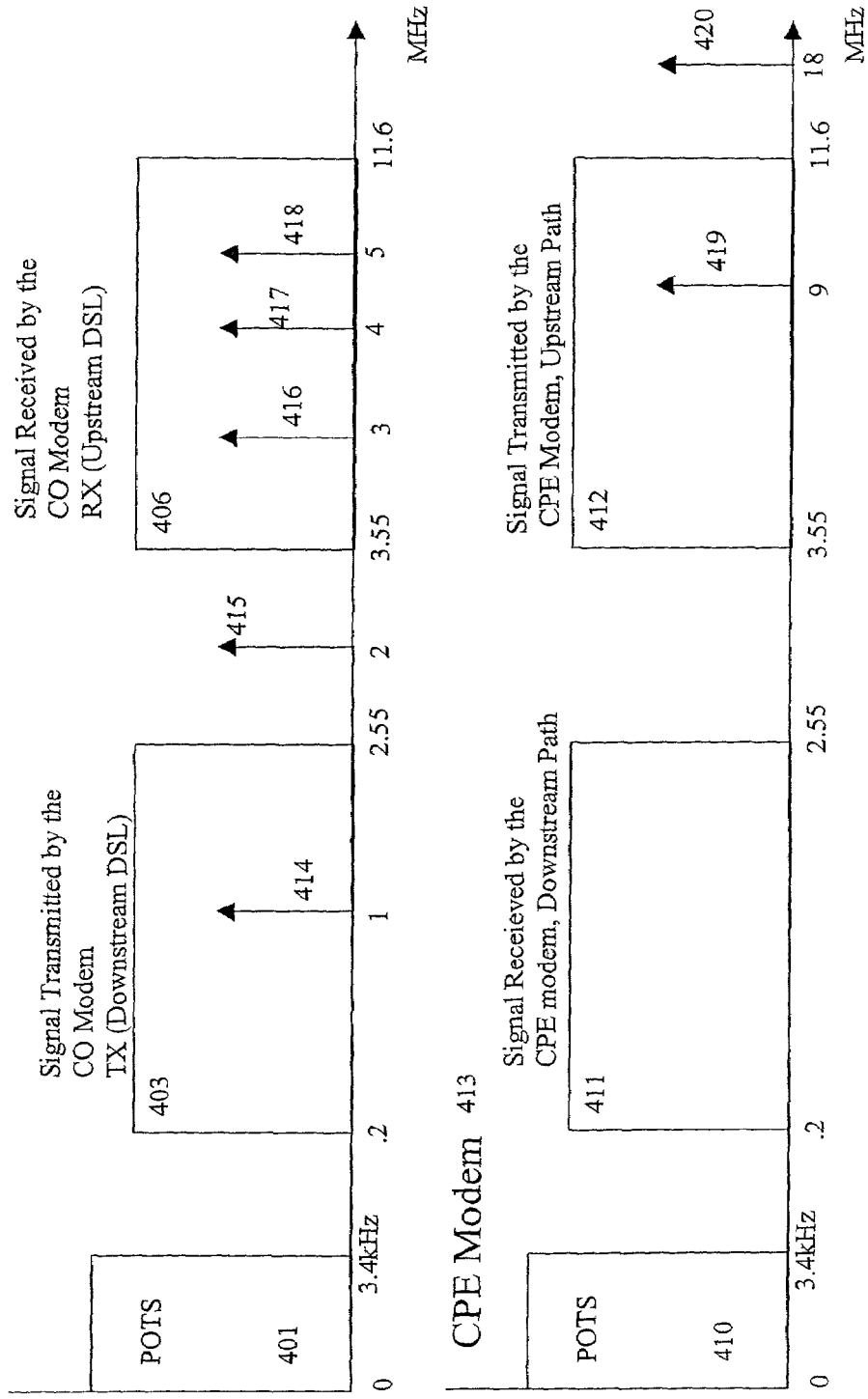
FIG. 4 is a representation of a frequency spectrum typically present on an unshielded twisted pair (UTP) utilized in an xDSL system.

FIG. 4 is a representation of a frequency spectrum typically present on an unshielded twisted pair (UTP), as utilized in an xDSL system as viewed at the CO modem and CPE modem. A DSL signal typically shares a frequency spectrum available on a transmission line with a voice signal. In a typical DSL system, a voice signal 401, 410 is present from 0 to 3.4 kilohertz.

A DSL signal typically includes two bands, one carrying a down stream DSL signal, the other carrying an up stream DSL band signal. The down stream DSL signal 403 for a CO modem 400 is typically present from 0.2 to 2.55 megahertz (MHZ). The up stream DSL signal 406 of a CO modem 400 is typically present from 3.55 to 11.6 MHz. The upstream and down stream designations are swapped if one looks at the CPE modem 413 as a reference point. Frequency spectrums 400, 413 illustrates a typical DSL spectrums including a POTS signal 401, a down stream DSL signal 403, 411 and an up stream DSL signal at 406, 412. As will be appreciated by those skilled in the art alternative frequency plans may be utilized. Those skilled in the art will also realize that the spectrum 400 designated as corresponding to the CO modem, and the spectrum as designated as corresponding to the CPE modem 413 may be exchanged when utilized in alternative embodiments of the invention. The frequencies listed above are exemplary.

The modem that is the predominant contributor to system distortion is the modem that transmits in a band lower in frequency than its receive band. As shown in the figure the modem contributing the most to the distortion is the CO side modem 400.

In the present embodiments harmonic distortion tend to be primarily problematic. Harmonic distortion produced by a signal 414 transmitted in a transmitter band 403, that is lower in frequency than the receiver band 406 of frequencies. With this arrangement of frequency bands some harmonics, 416, 417, 418, tend to fall in the receive band 606. On the other hand Harmonic distortion produced in the CPE Modem 413, tend to not create as many problems since the receive 411 band falls below the transmit band 412. hence a harmonic 420 produced by a fundamental 419 tends not to interfere with the lower receive band 411.

Echo also tends to be a problem in the DSL transmission system described above. Echo produced in each transmitter and reflecting back into the receiver tends to saturate the receiver in both the CO and CPE modems.

Figure 5A:
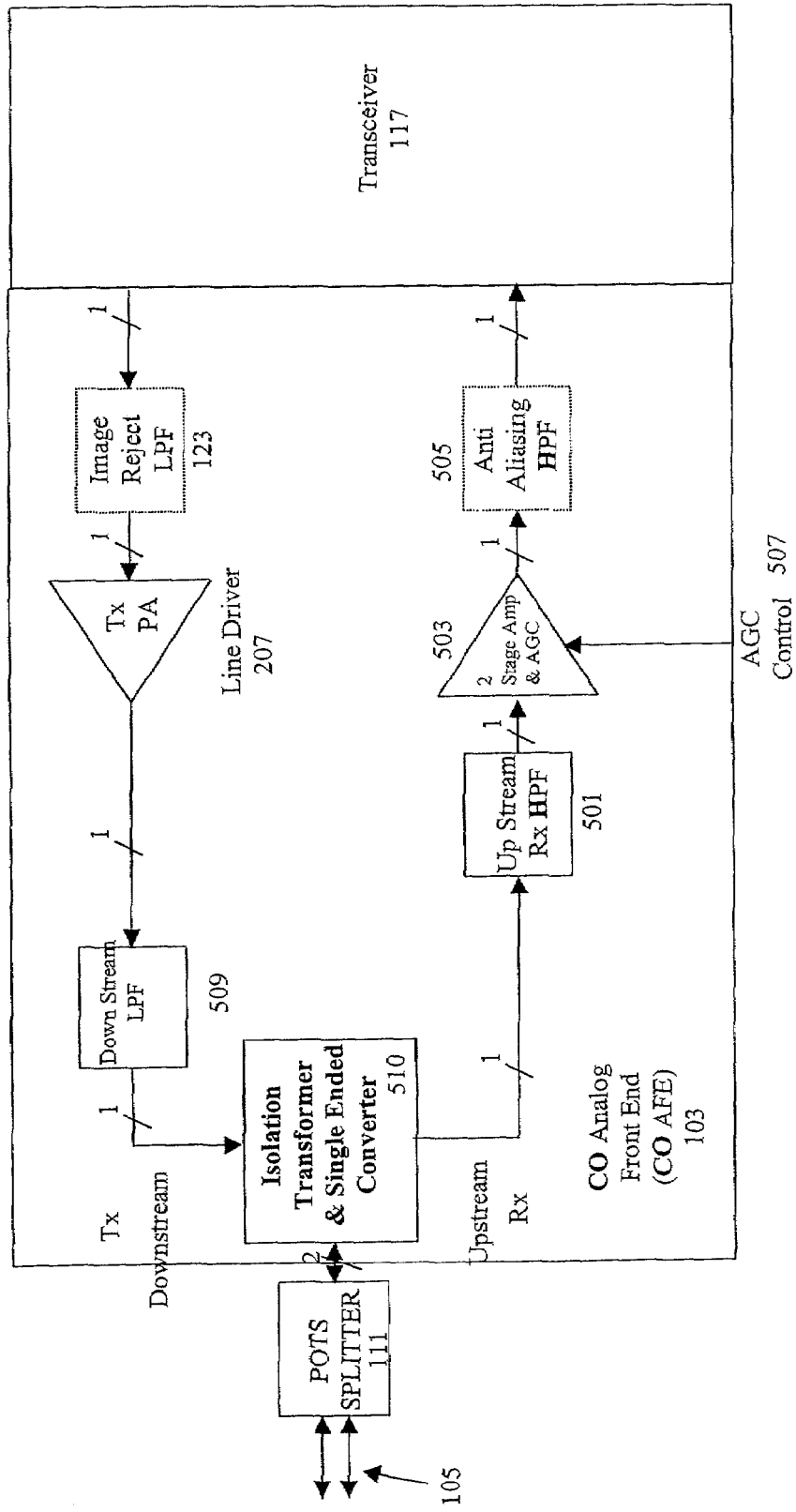
FIG. 5a is a block diagram of an embodiment of a single ended CO AFE, utilizing a two stage AGC amplifier.

FIG. 5a is a block diagram of an embodiment of a single ended AFE, utilizing a two stage AGC amplifier. As will be appreciated by those skilled in the art the operation of the single ended AFE is independent of the use of the two-stage AGC amplifier. A single ended AFE may be constructed with or without an AGC amplifier. Likewise, an AGC amplifier may be modified accordingly for use in a single ended AFE or a conventional balanced AFE. The two stage AGC amplifier shown is exemplary. Those skilled in the art will appreciate that AGC may be practiced utilizing any number of AGC amplifier designs.

The single ended circuitry described in the embodiment allows parts count to be approximately halved and provides sufficient performance for use in a DSL service application. The conventional wisdom in analog front end design would be to utilize a balanced circuit in such a low level signal amplication susceptible to high noise levels.

In single ended CO AFE 103 a twisted pair transmission line 105 is coupled to a POTS splitter 111. The opposite terminal of POTS splitter 111 is coupled differentially to an isolation transformer and single ended converter 510. A first single ended input of isolation transformer and single ended converter 510 is coupled to a single ended output of down stream low pass filter 509. An input of down stream low pass filter 509 is coupled to a single ended output of line driver 207. A single ended input of line driver 207 is coupled to a single ended output at image reject low pass filter 123. An input of image reject low pass filter 123 is coupled to a single ended transceiver output 117. Note in alternative embodiments image reject low pass filter 123 may be omitted.

A second singled ended output of isolation transformer and singled ended converter 510 is coupled to a single ended input of up stream receive high pass filter 501. An output of up stream receive high pass filter 501 is coupled to a single ended input of a two-stage amp and AGC 503. A single ended output of two-stage amp and AGC 503 is coupled to an input of an anti-aliasing high pass filter 505. A single ended output of anti-aliasing high pass filter 505 is coupled to the transceiver 117. An external AGC control 507 is coupled to two-stage amplifier and AGC 503 at its AGC control input.

Single ended conversion in the isolation transformer and single ended converter 510 has accomplished as previously described in FIG. 1b. In addition, impedance matching resister R is incorporated into the isolation transformer and single ended converter 510 and is coupled to the output of downstream low pass filter 509.

Figure 5B:
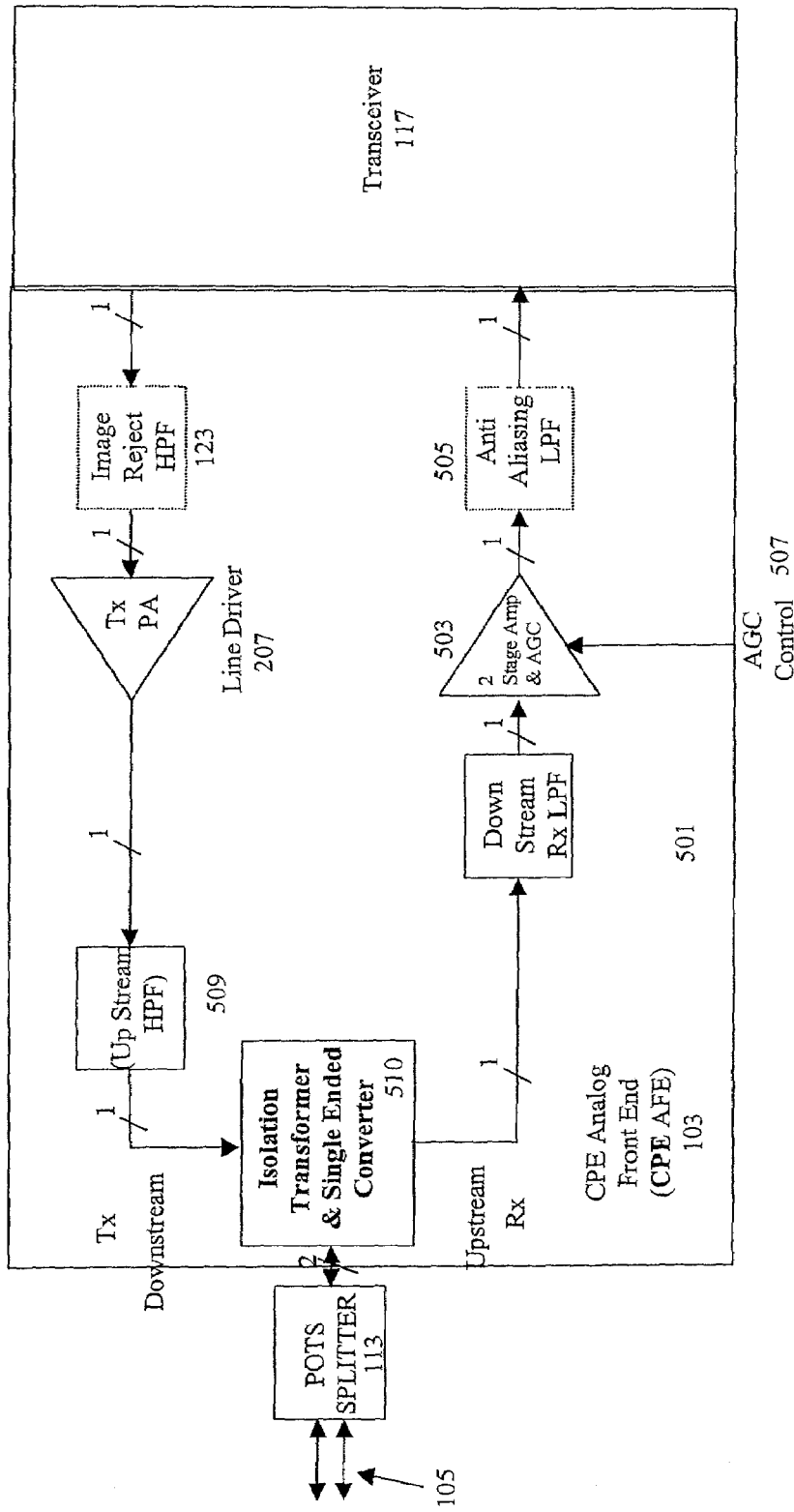
FIG. 5b is a block diagram of an embodiment of a single ended CPE AFE.

FIG. 5b is a block diagram of an embodiment of a single ended CPE AFE. This embodiment utilizes an isolation transformer and single ended converter 510 as previously described in relation to FIG. 5a. A twisted pair transmission line 105 is coupled to an input of POTS splitter 111. A balanced output of POTS splitter 111 is coupled to a balanced input of isolation transformer and single ended converter 510. A first output of isolation transformer and single ended converter 510 is coupled to a single ended output of down stream low pass filter 509. An input of down stream low pass filter 509 is coupled to a single ended output of line driver 207. A single ended input of line driver 207 is coupled to a single ended output of image reject low pass filter 123. A single ended input of image reject low pass filter 123 is coupled to transceiver 117.

A second single ended output of isolation transformer and single ended converter 510 is coupled to an input of up stream receive high pass filter 501. An output of up stream receive high pass filter 501 is coupled to a single ended input of two-stage amplifier and AGC 503. A single ended output of the two-stage amp and AGC is coupled to a single ended input of anti-aliasing high pass filter 505. An output of anti-aliasing high pass filter 505 is coupled to transceiver 117. An external AGC control 507 is coupled to the two-stage amp and AGC 503 at its control input.

Additional circuit design embodiments tend to contribute to improved performance and reduced cost in a DSL service application. Additional embodiments of analog front ends include dynamic signal level control by attenuators, distortion cancellation utilizing echo cancellation circuitry, and lightning insensitive filters. Each of these embodiments is described in the following paragraphs. Equivalently it is contemplated that the analog front end embodiments described are not limited to DSL systems, but will apply in any situation where performance may be improved by utilizing a particular embodiment of the described invention.

Dynamic Range Control by Attenuators

The length of wire that is going to be used with a DSL system is unknown or unpredictable. For example length is determined by the copper wire utilized over the distance between the central office and the home. The twisted pair wire length could typically vary from three miles to 100 feet or less. Thus, the input stage (or analog front end) to a DSL system will typically include a receiver having an amplifier with a high dynamic range. The high dynamic range is typically achieved by using automatic gain control amplifiers having a very wide dynamic range, that are typically very expensive.

Figure 6:
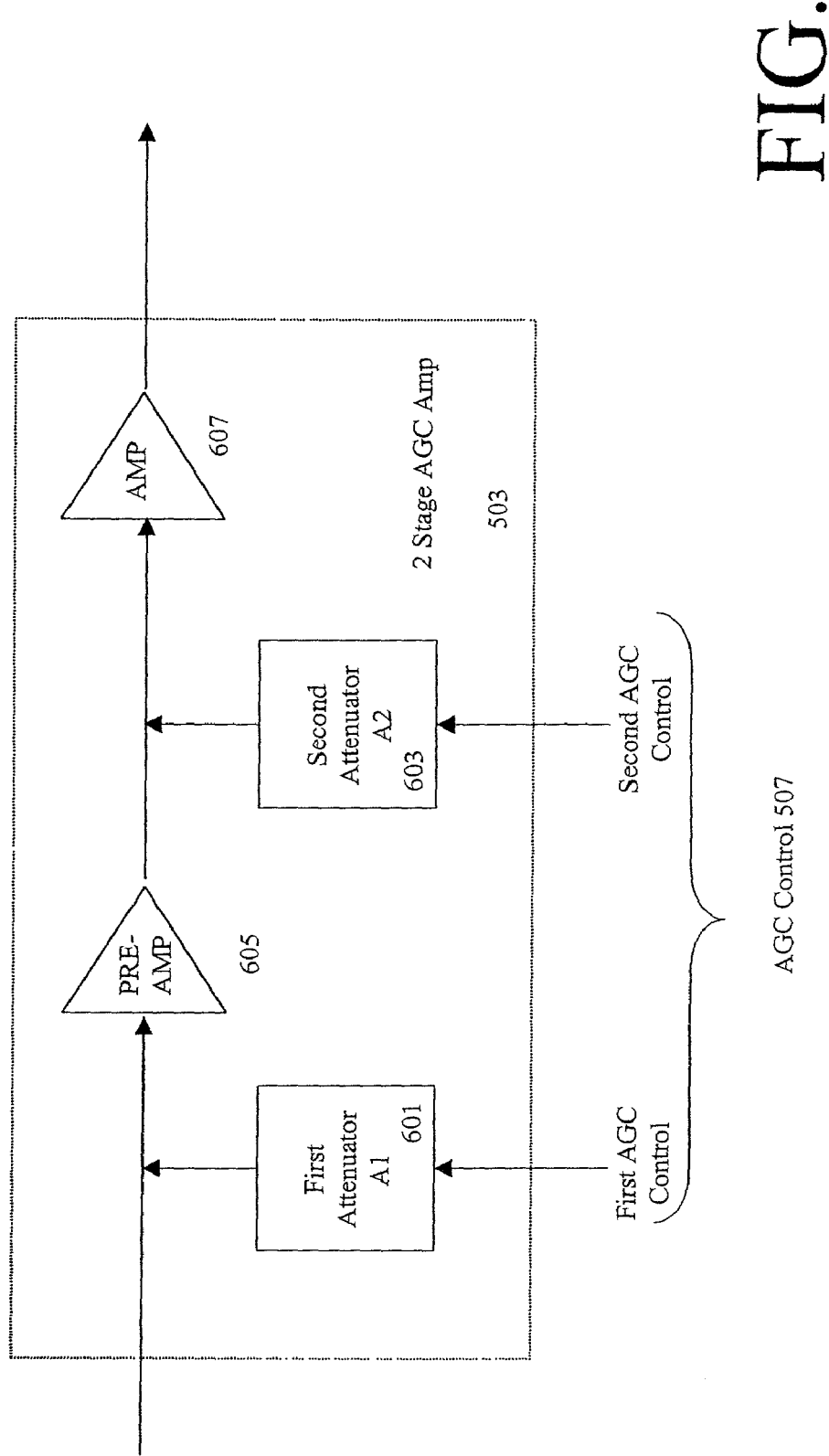
FIG. 6 is a block diagram of a two stage amplifier utilizing dynamic range control by attenuators.

FIG. 6 is a block diagram of a two-stage amplifier utilizing dynamic range control by attenuator 601, 603. In the embodiment shown, a typical resistance range from 0.5 ohms to that of an open circuit may be achieved. In an embodiment, a pair of FET transistors are configured as voltage-controlled resistors for use in each attenuator 601, 603.

In the embodiment of the attenuator shown, an input to a preamplifier 605 is coupled to an output of a first attenuator 601. An output of preamplifier 605 is coupled to an input of an amplifier 607 and an output of a second attenuator 603. An output of amplifier 607 provides a signal whose amplitude is controlled. AGC control signal 507 comprises two individual signals, a first AGC control signal coupled to first attenuator 601, and a second AGC control signal coupled to an input of the second attenuator 603. In the embodiment shown single ended amplifiers 605, 607 are utilized. However, in equivalent configurations balanced circuits may be utilized.

Figure 7:
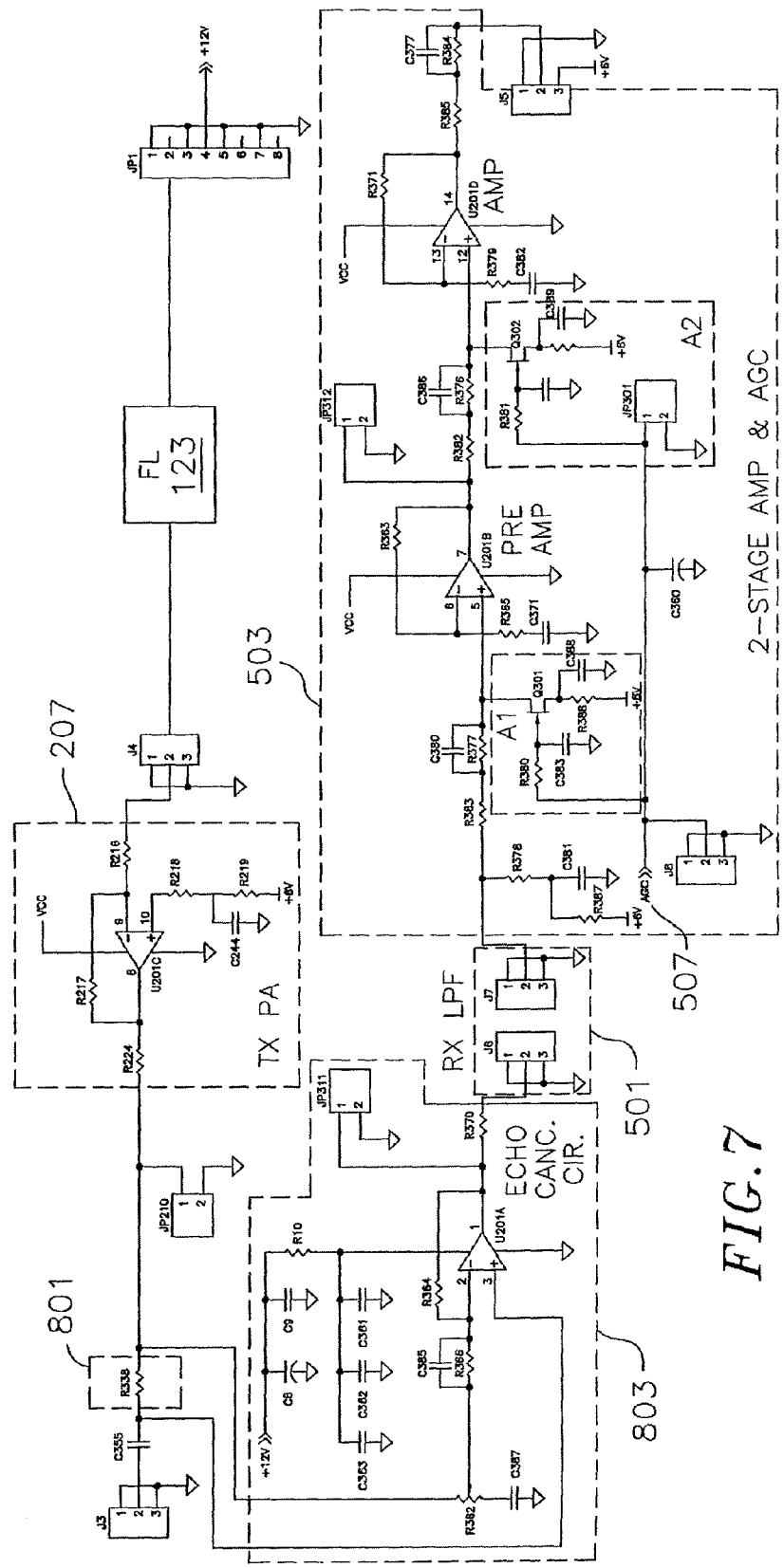
FIG. 7 is a schematic of a circuit utilizing two stages of attenuation by voltage controlled resistors to limit distortion in a pre amplifier and amplifier.

FIG. 7 is a schematic of a circuit utilizing two stages of attenuation A1, A2 provided by FET's Q301, Q302 configured as voltage controlled resistors to limit distortion in pre amplifier U201B and amplifier U201D, respectively. In the embodiment shown the amplifier inputs are kept low. Control of the amplifiers outputs is typically accomplished by providing control of the total gain of the two amplifiers, but also by maintaining a low amplifier input voltage, to reduce distortion created in the amplifier. Higher signal levels applied to the amplifier result in higher distortion in the amplified signal. Unlike an AGC amplifier that simply controls gain, a lower voltage is maintained at the input of the amplifiers keeping the output of the amplifiers low. In an AGC amplifier variable gain is produced that tends to control the output level. However, the input in a typical AGC amplifier is still presented with a high signal level that tends to generate distortion in The AGC amplifier.

The U201A is an echo cancellation amplifier that is part of a distortion cancellation circuit 803. Echo is a portion of a signal transmitted from an AFE that has been reflected back into a receiver of the same AFE. The echo cancellation circuit provides the input to the embodiment of the invention including The attenuators and amplifiers.

The echo cancellation circuit tends to help reduce distortion and additionally the amplifier tends to provide signal amplification. Next the signal passes through a filter 501, RX LPF, that tends to further reduce the echo. Since transmission is on one set of frequencies and reception is on another set of frequencies, when the transmitter signal goes out, some of it comes back as an echo. Because of echo cancellation circuitry present in the circuit much of the echo is canceled. The filter 501, RX LPF, tends to prevent residual echo from penetrating into the subsequent circuitry.

The attenuator circuits A1, A2 keep the input voltage to the amplifiers U203B, U203C low, thus reducing distortion produced in the amplifiers. For example the amplifiers U203B, U203C typically operate from a 12 v supply. In the case of a strong signal being applied there are almost twelve volts at the amplifier input. If a typical AGC amplifier is used here, the input will have to be able to handle an input signal voltage close to 12 v, or the received signal will have to be attenuated first. In the embodiment shown, when a strong input signal is present, attenuation is needed to lower the input voltage to the amplifiers so that the amplifier output remains well below the supply rail voltage.

To reduce cost while maintaining performance, a circuit has been developed that has amplifiers with a large gain and variable attenuation produced by using FETs as viable resistors, or VCR's (voltage Controlled Resistors) to produce attenuation. The incoming signal coupled to different stages is attenuated by changing the DC voltage to a gate of the FET. In the described embodiment the resistance of the FET Q301, Q302 acting as a VCR can be anywhere from infinity down to 18 ohms. However, it is contemplated that equivalently FET resistors having a resistance varying from zero to infinite resistance may be used in the circuit.

A signal divider is formed from a network comprising resistors and capacitors. In the embodiment shown the network comprises: R370, R383, R377, C380 and FET resistor Q301.

Also included in the voltage divider is the filter RX LPF. In the embodiment shown R383 is 0 ohm, but in alternative embodiments its value could be 1,000 ohms or any other suitable value for a given circuit implementation. The two impedances total in parallel, and are reduced by adjusting the gates of the viable FET resistor. Bypass components B1 are added and tend to preserve a "clean signal". The signal must be kept clean because any little noise present at this point in the circuit propagates through the circuit.

Use of one attenuator stage requires a single high resistance value to achieve a given attenuation range. Two attenuator stages allow 2 attenuation steps that permit lower values of resistances to be used in each stage and achieve the same attenuation. Dual attenuator stages A1, A2 are utilized here because large resistors values in the circuit tend to prevent achieving a low noise level. Thus, two stages are utilized in parallel to achieve a desired attenuation. Alternatively, the stages may be cascades. The two stages are series connected and receive command signals simultaneously. In the embodiment shown the FETs in each attenuator stage A1, A2 are supplied the same voltage. If necessary for satisfactory operation resistor R365 is biased a little higher in voltage than resistor R379. Biasing one attenuator at a higher voltage will cause the attenuator including that circuit to attack, or attenuate, first. Therefore, attenuator A1 is applied a little faster, or harder than A2.

Distortion Cancellation Utilizing Echo Cancellation Circuitry

Figure 8:
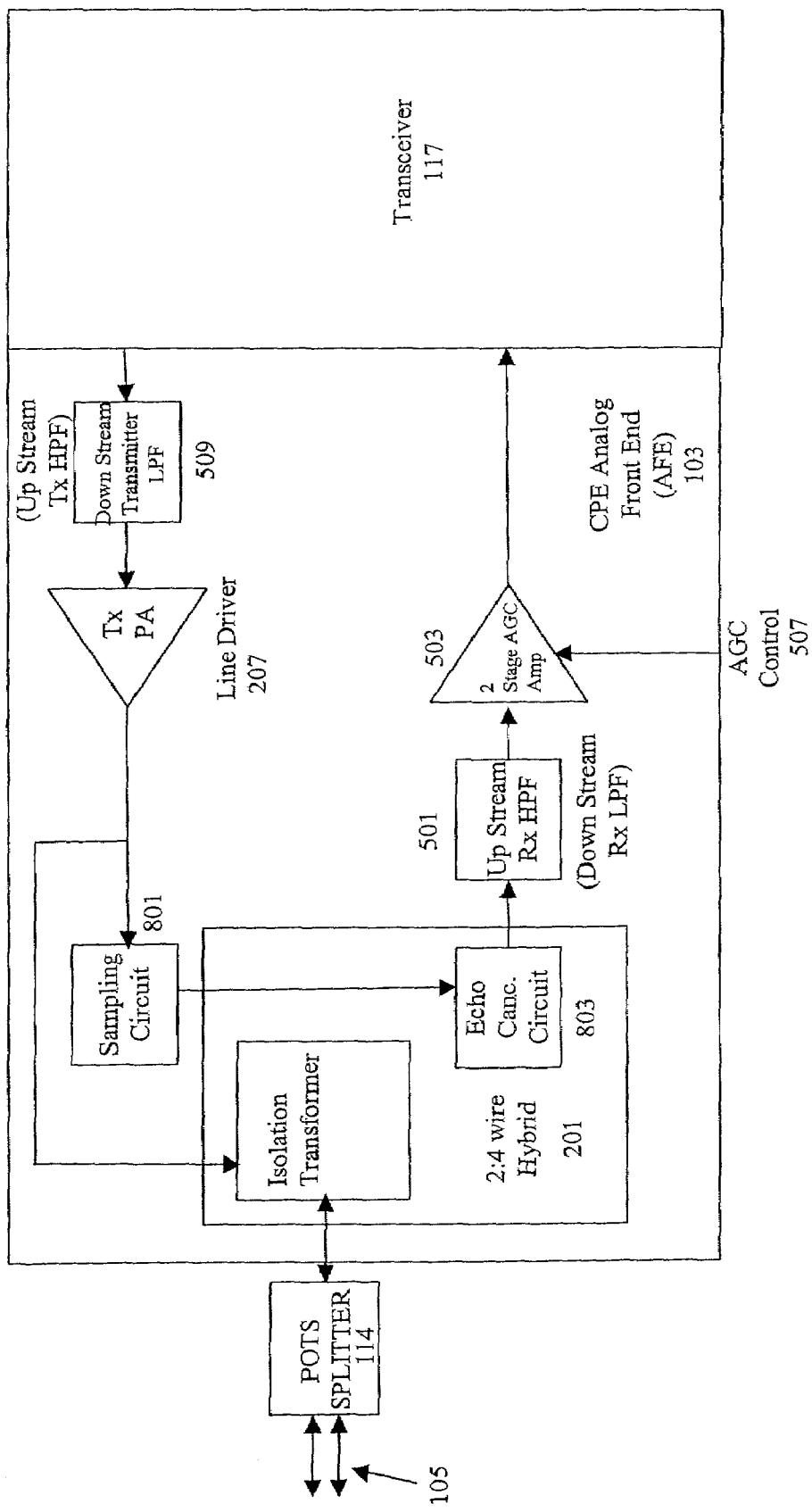
FIG. 8 is a block diagram illustrating the use of an echo canceling circuit to reduce distortion.

FIG. 8 is a block diagram illustrating the use of an echo cancellation circuit to reduce distortion. In the embodiment shown, in the echo cancellation circuit 501 is utilized to cancel echo and distortion that is present in a DSL front end.

An unshielded twisted pair transmission line 105 is coupled to an input of a POTS splitter 111, which is in turn coupled to a 2:4 hybrid including an echo cancellation circuit as described in FIG. 1b. An input of the hybrid and echo cancellation circuit 218 is coupled to an output of a sampling circuit 801, that is the same as the impedance matching resistor R. An input of sampling circuit 801 is coupled to an output of line driver 207. An input of line driver 207 is coupled to an output of low pass filter 509. An input of low pass filter 509 is coupled to a down stream transmitter path of the transceiver 117.

An output from sampling circuit 801 is coupled to an input of echo cancellation circuit 501. An output of echo cancellation circuit 803 is coupled to an up stream receiver high pass filter 501. An output of up stream receiver high pass filter 501 is coupled to an input of a two-stage AGC amplifier 503. An output of the two-stage AGC amplifier is coupled to an input of an anti-aliasing low pass filter 505. An output of the anti-aliasing low pass filter is coupled to an up stream receiver path of transceiver 117. Transceiver 117 provides an AGC control that is coupled to the two-stage AGC amplifier 503.

Figure 9:
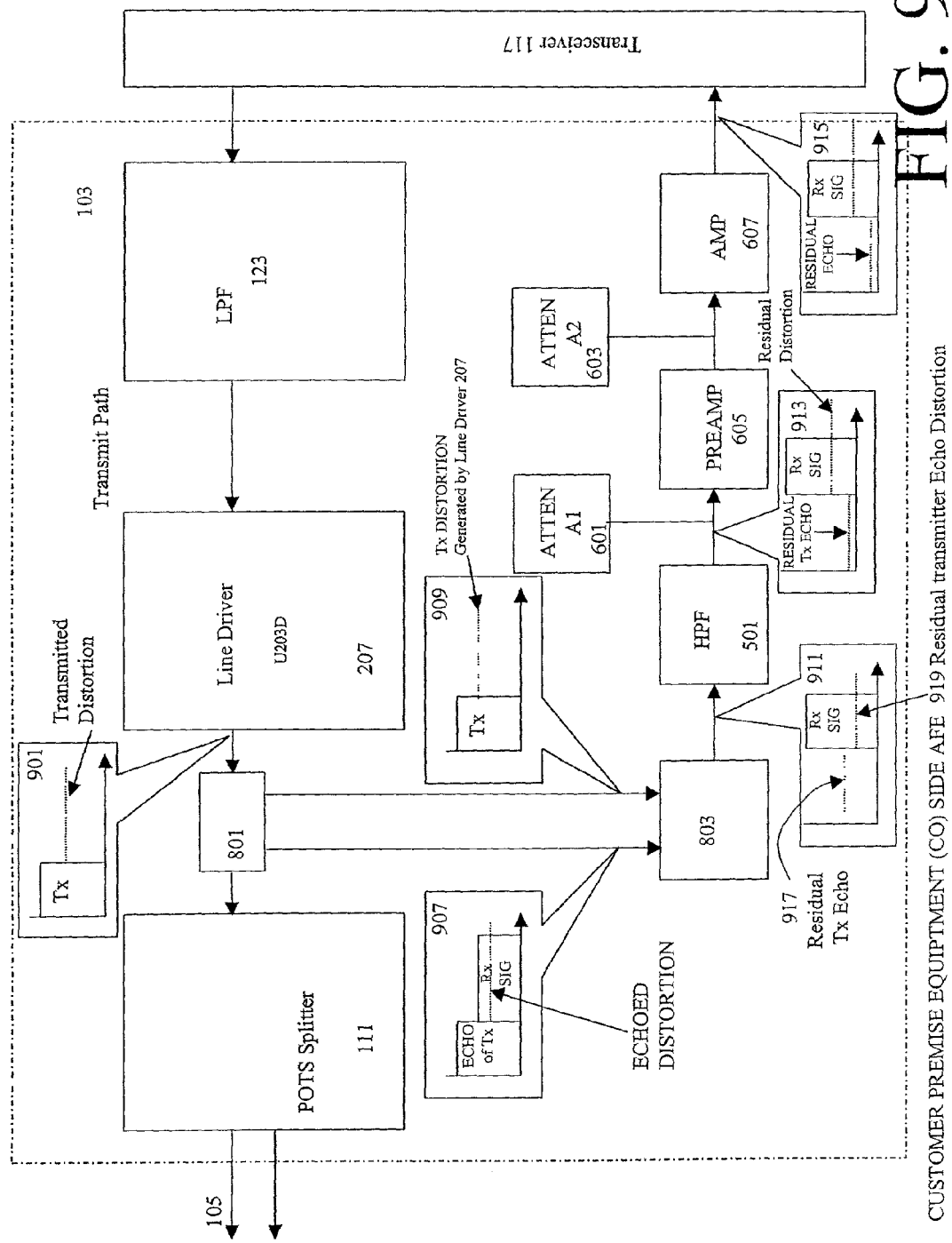
FIG. 9 is a diagram illustrating the process of distortion reduction by utilizing echo cancellation.

FIG. 9 is a diagram illustrating the process of distortion reduction by utilizing echo cancellation. In the customer premise equipment side analog front end shown, distortion is being cancelled from a transmitted signal 901. While signal 901 is being transmitted, a simultaneous received signal including echoed distortion 907 is present. It is desired to cancel the echo distortion from a received signal that is eventually presented to transceiver 117. The received signal is especially susceptible to interference caused by distortion, since it is typically of much lower level than the transmitted signal. Transmitted signal 901 transmits its own signal, DTx, as well as distortion generated in line driver circuit 207. Sampling circuit 801 provides a sample of signal 901 to the input of the echo cancellation circuit 803. An incoming signal received from the unshielded twisted pair 105 is provided directly to the echo cancellation circuit 801. The incoming signal 907 includes an echo of signal 901 and its distortion, and also a received signal that is typically much smaller in amplitude than the received transmitted echo. As can be seen in spectrum 907, the echo of the distortion from signal 901 falls in band with the received signal, tending to interfere with the received signal. Thus, it is desirable to reduce the echo distortion to prevent its interference with the received signal. Echo cancellation circuit 803 compares the transmitted signal to the received signal having the transmitter echo and the echoed transmitter distortion, and produces a signal 911 including a residual transmitter echo 917 and a residual transmitter distortion 919. The residual distortion signal 919 is still present in band with the received signal. The echo cancellation circuit 803 tends to cancel the echoed transmitter signal and the distortion that has been echoed along with it from the line driver 207. The residual transmitter echo signal 917 typically tends to be greater than the residual distortion signal 919 because it is much stronger initially, adding to the distortion present. The output of the echo distortion circuit 803 is coupled to an input of a high pass filter 501. An output of 501 is coupled to a pre-amp 605 and an attenuator 601. The high pass filter 501 tends to pass the received signal and block the residual transmitter echo 917. Thus, the output of high pass filter 501 includes a residual transmitter echo signal that has been reduced from the residual distortion signal. In addition, the residual distortion falling in band with the received signal has been reduced below the value present in the received spectrum 907. The amplifiers 605, 607 and attenuators 601, 603 condition the amplitude of the received signal such that it is suitable to be coupled to the transceiver 117.

Figure 10:
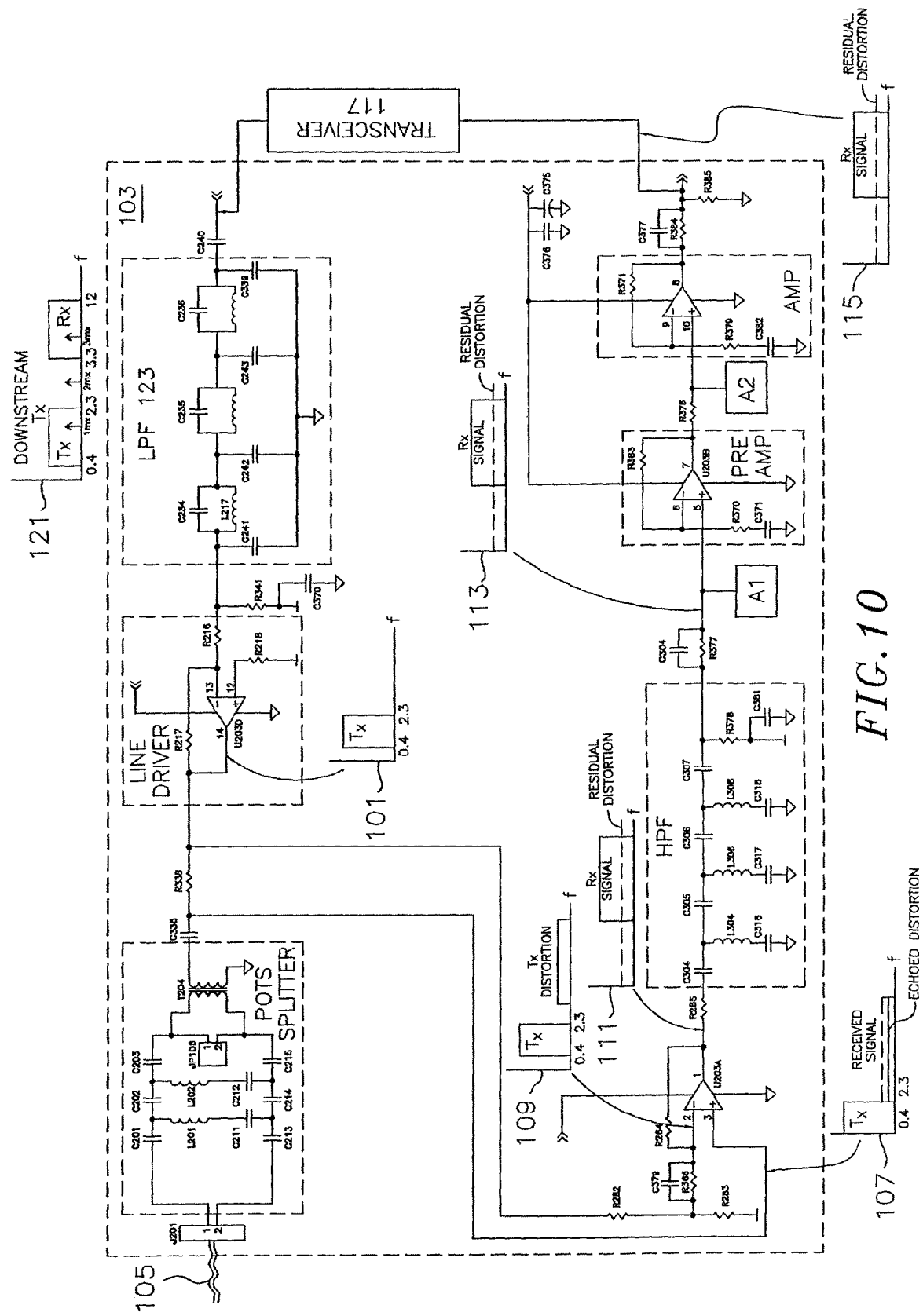
FIG. 10 is an embodiment of distortion cancellation by echo cancellation circuitry that includes elements that are functionally equivalent to the elements shown in the schematic of the Analog Front End (AFE) of FIG. 7.

FIG. 10 is an embodiment of distortion cancellation by echo cancellation circuitry that includes elements that are functionally equivalent to the elements shown in the schematic of the Analog Front End (AFE) of FIG. 7 (FIG. 7 was used to illustrate an embodiment of dynamic range control by attenuators). In FIG. 10 the attenuator circuits of FIG. 7 are shown in simplified form as blocks A1 and A2.

A high pass filter, HPF, is shown in the embodiment of FIG. 10, while a LPF was shown in FIG. 7. In FIG. 7 a location for a plug-in type low pass filter, RX LPF, is indicated. The type of filter utilized depends upon the physical location of the Analog Front End 103. A system of analog front ends tend to include one that is designated for use at a CO site and one that is designated a CPE site analog front end. The same basic Analog Front End design would be used in both locations. The Central Office Site (CO) site, and Customer Premises Equipment (CPE) site may be separated by a distance from the customer to a central office, or may be co-located at a site that is remote from a central office. The designated location in which the Analog Front End resides (CO or CPE) determines which type of filter (HPF for a CPE designated location, or a LPF for a CO designated location) will be utilized.

The amplifiers in the receiver chain are active devices, amplifiers tend to only pass signals without distortion up to a certain level of input. When a high signal level is applied to the amplifier, the active devices in the amplifier output at high signal levels, producing non-linear distortion. Non-linear distortion appears as frequencies not having been in existence before. The non linear distortion is primarily harmonic.

Frequency spectrum 121 illustrates the location of exemplary harmonic distortion that is produced in the exemplary CPE side Analog front end shown. Distortion produced by The Tx signal typically falls within the receive (Rx) band as shown. Transceiver 117 produces a DAC output that is applied to a LPF, 123. In the embodiment shown LPF 123 is a seventh order elliptic filter. A filter such as LPF 123 typically provides enough second and third harmonic rejection to ultimately produce a Tx signal with low distortion as shown in spectrum 101.

A line driver amplifier U203D produces a relatively clean transmission signal (Tx) 101. The signal travels out of the analog front end circuit, typically disposed on a printed circuit board 103, and travels down a twisted pair transmission line 105. Because of mismatches or other discontinuities encountered on the transmission path there is an echo signal 107 being sent back to the analog front end circuit card that the signal originated from.

Spectrum 107 illustrates the signal spectrum of a received signal including an echo of a previously transmitted signal, Tx. The received signal includes a transmitted signal (Tx) being sent to the AFE, and an echo component of the signal out of the AFE. 101, plus distortion 102 that was introduced after the signal was sent out of The AFE.

The distortion and echo are introduced into a receiver. If the receiver has a mismatch present at its input the distortion and echo are typically worsened. The embodiment described tends to reduce distortion even under these worsened conditions. To cancel the echo, a sample of the transmission signal 109, which is taken from the output of U203D, is compared to the echo signal 107. Comparison is made by a difference amplifier U203A. The sampled signal 109 includes transmission distortion as shown that tends to be generated by U203D. Echo signal 107 includes the received signal and echoed transmission distortion (ECHO). The sample output 109 and echo signal 107 are fed into the differential amplifier U203A that outputs a signal 111 having a reduced echo, and typically only residual distortion.

Amplifier U203A is the echo cancellation amplifier. Negative input of this pre-amplifier stage or echo cancellation stage is the signal 109 that originates from line driver U203D. The transmitter signal as it appears on the telephone wire including distortion 107, is coupled to the positive input of U203A.

Spectrum 111 illustrates the output of the echo cancellation circuit U203A, pin 1. By having the amplifier output tied to the negative amplifier input, the amplifier output is subtracted from the signal plus distortion signal present at the positive amplifier input. Thus, the output of the amplifier U2302A is the signal present with typically reduced distortion.

The signal spectrum 111 is next filtered by a high pass filter HPF, to remove residual Tx echo, and applied to the attenuator circuits A1 and A2 where the signal's range is dynamically controlled by attenuators A1 and A2 as described above.

After signal spectrum 113 has been conditioned by attenuator A1, Pre amp U203B, Attenuator A2, and amplifier U203C the signal spectrum appears similar to the spectrum shown at 115. The spectrum shown in 115 is that of an acceptably clean Rx signal that is routed to The transceiver 117.

Filters Capable of Withstanding Lightning

Figure 11:
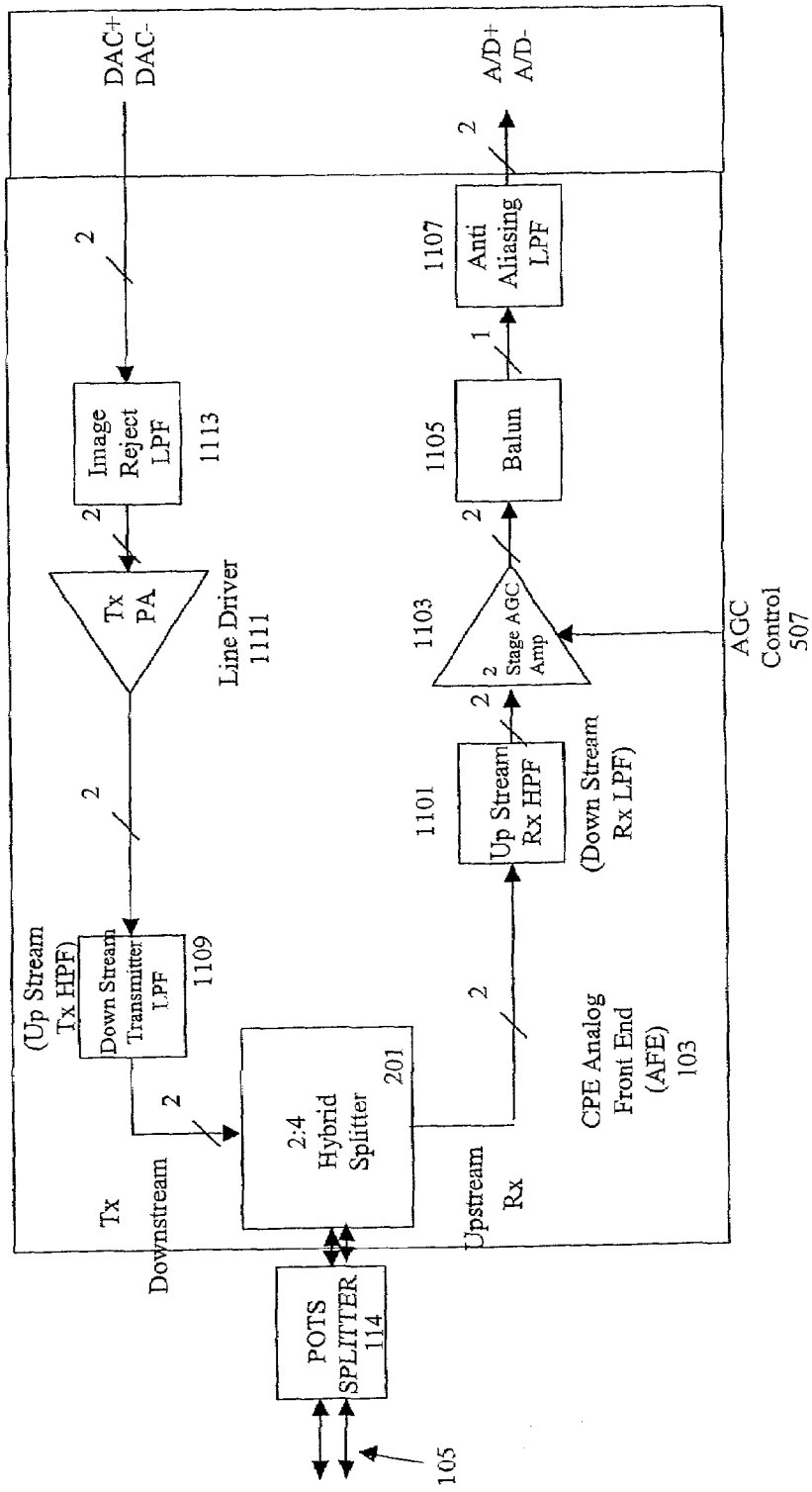
FIG. 11 is a block diagram of an AFE utilizing lightning insensitive filters.

FIG. 11 is a block diagram of an AFE utilizing lightning and insensitive filters. A lightning insensitive filter is disposed in high pass filter 114 of the POTS splitter. In the lightning insensitive filter high inrush currents into capacitors are controlled to prevent damage from a current surge initiated by a lightning strike. An unshielded twisted pair 105 is coupled to half of the POTS splitter 111, which is in turn coupled to a transformer 201. An output of hybrid splitter 201 is coupled to an input of an up stream receiver high pass filter 1101. An output of up stream receiver high pass filter 1101 is coupled to an input of a two-stage AGC amplifier 1103. An output of two-stage AGC amplifier 1103 is coupled to an input of a balun circuit 1105. Balun circuit 1105 is conventionally constructed as is known to those skilled in the art. The single-ended output of the balun circuit 1105 is coupled to an anti-aliasing low pass filter 1107. An output of anti-aliasing low pass filter 1107 is coupled to plus and minus A to D converters in transceiver 117. An AGC control line 507 is coupled to two-stage AGC amplifier 1103 from the transceiver 117.

A second input of hybrid 201 is coupled to an output of a down stream transmitter low pass filter 1109. An input of down stream transmitter low pass filter 1109 is coupled to an output of line driver 1111. An input of line driver 1111 is coupled to an output of image reject low pass filter 1113. An input at image reject low pass filter 113 is coupled to the plus and minus DACS of transceiver 117.

In the embodiment shown, the components in filter circuit 114, utilize high breakdown voltage parts having a sufficient breakdown voltage to withstand lightning that may typically be encountered in an analog front end. Lightning may be considered an electrical signal having the majority of its energy distributed at high frequencies. Thus the HPF by charging the capacitors, makes the modem's impedance to lightning very high. Thus, very little energy from the lightning strike is absorbed, protecting circuitry subsequent to the filter, and the filter its self, from burn-out damage. In order for the filter to withstand the energy present in the lightning, the breakdown voltages of the components are selected such that they are not damaged by a typical lightning strike. In addition, the remainder of the components in the analog front end 103 are selected to have high breakdown voltages to prevent damage by residual energy that may pass through the high pass filter. Lightning insensitive filters may be used in the CO or CPE analog front ends.

Figure 12:
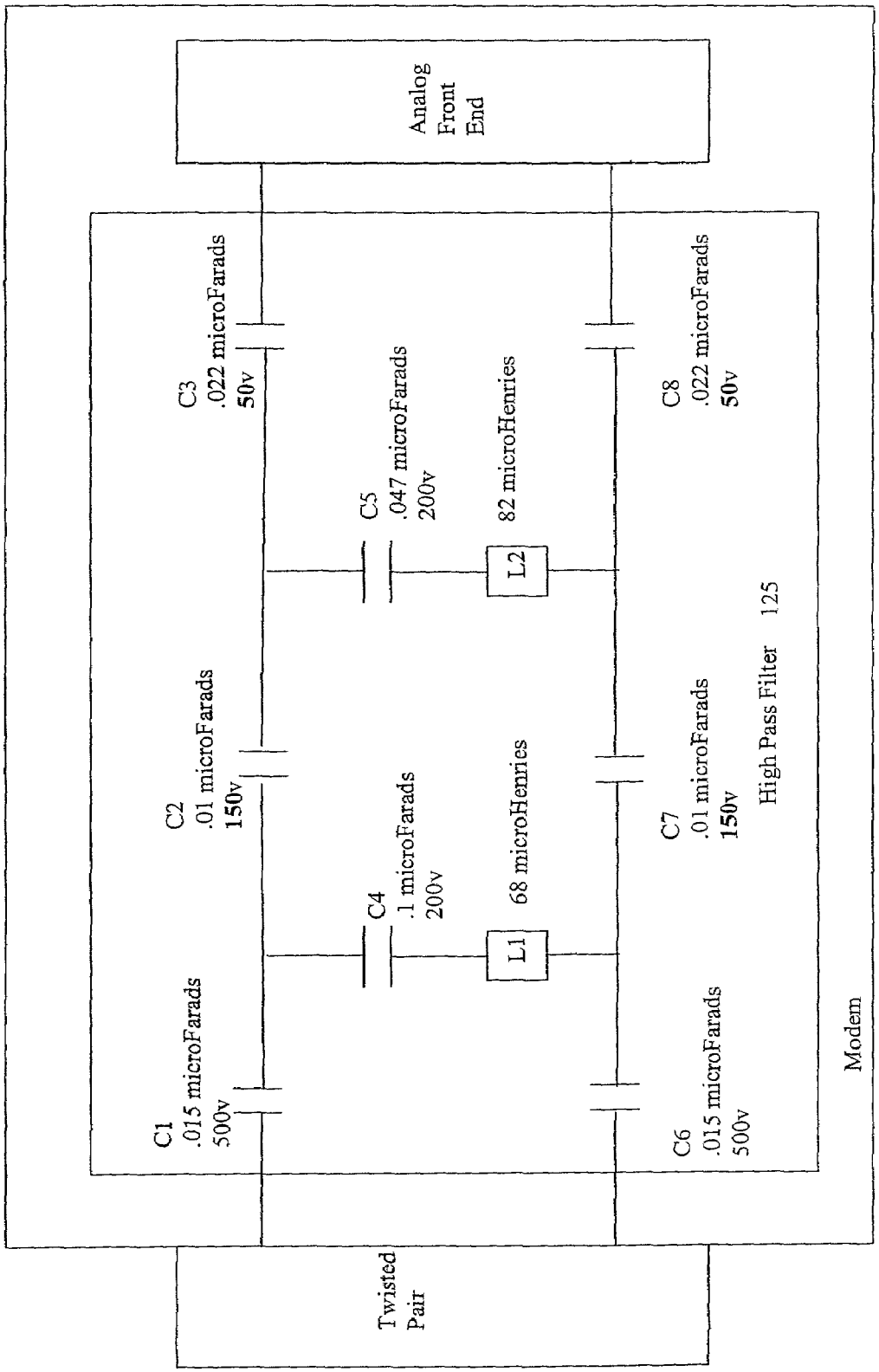
FIG. 12 is a schematic of an embodiment of a CO high pass filter (HPF) that is capable of withstanding lightning.

FIG. 12 is a schematic of a first embodiment of a high pass filter (HPF) that is capable of withstanding lightning. The HPF 125 protects subsequent circuitry from lightning by providing a high impedance to The lightning surge, preventing it from entering and damaging subsequent circuitry.

Lightning reaching an AFE through a twisted pair transmission line is typically characterized as either common mode or longitudinal. Voltage applied across the terminals of a twisted pair provides a simulated common mode lightning signal. When the same voltage is applied to each conductor of a twisted pair and referenced to ground a signal simulating a longitudinal lightning signal is produced. An isolation transformer 510 disposed in the analog front end 103 and coupled to the Tx high pass filter 509 provides isolation against longitudinal lightning strikes when the filter is designed as previously described to limit inrush currents.

The primary of the transformer is coupled through the high pass filter to each conductor of the twisted pair transmission line and the secondary has one terminal coupled to ground and the other terminal coupled to internal circuitry in the analog front end. Often the terminal of the secondary coupled to the analog front end circuitry couples sensitive semiconductor circuits such as line driver amplifiers to the twisted pair transmission line, making them susceptible to lightning damage. In alternative embodiments extra protection is provided by disposing snubbing diodes across the output of the semiconductor circuits such as the line driver.

FIG. 12 is a schematic diagram of an embodiment of a lightning insensitive filter. In the embodiment shown a first terminal of capacitor C1 is coupled to a first terminal of a twisted pair. A second terminal of capacitor C1 is coupled to a first terminal of capacitor C2 and a first terminal of capacitor C4. A second terminal of capacitor C2 is coupled to a first terminal of capacitor C5 and a first terminal of capacitor C3. A second terminal of capacitor C3 is coupled to a first terminal of an analog front end. A second terminal of capacitor C4 is coupled to a first terminal of inductor L1. A second terminal of capacitor C5 is coupled to a first terminal of inductor L2. A second terminal of the twisted pair is coupled to a first terminal of capacitor C6. A second terminal of capacitor C6 is coupled to a second terminal of inductor L1 and a first terminal of capacitor C7. A second terminal of capacitor C7 is coupled to a second terminal of inductor L2 and to a first terminal of capacitor C8. A second terminal of capacitor C8 is coupled to a second terminal of analog front end. Capacitor C1 is 0.015 microfarads with a breakdown voltage of 150 v. Capacitor C2 is a 0.01 microfarad capacitor with a breakdown voltage of 500 V. Capacitor C3 is a 0.022 microfarad capacitor with a breakdown voltage of 150 v. Capacitor C4 is a 0.1 microfarad capacitor with a breakdown voltage of 500 v. Capacitor C5 is a 0.047 microfarad capacitor with a breakdown voltage of 200 v. Inductor L1 is a 68 microhenry inductor. Inductor L2 is an 82 microhenry inductor. Capacitor C6 is a 0.015 microfarad capacitor with a breakdown voltage of 500 v. Capacitor C7 is a 0.01 microfarad capacitor with a breakdown voltage of 150 v. Capacitor C8 is a 0.022 microfarad capacitor with a breakdown voltage of 50 v.

Figure 13:
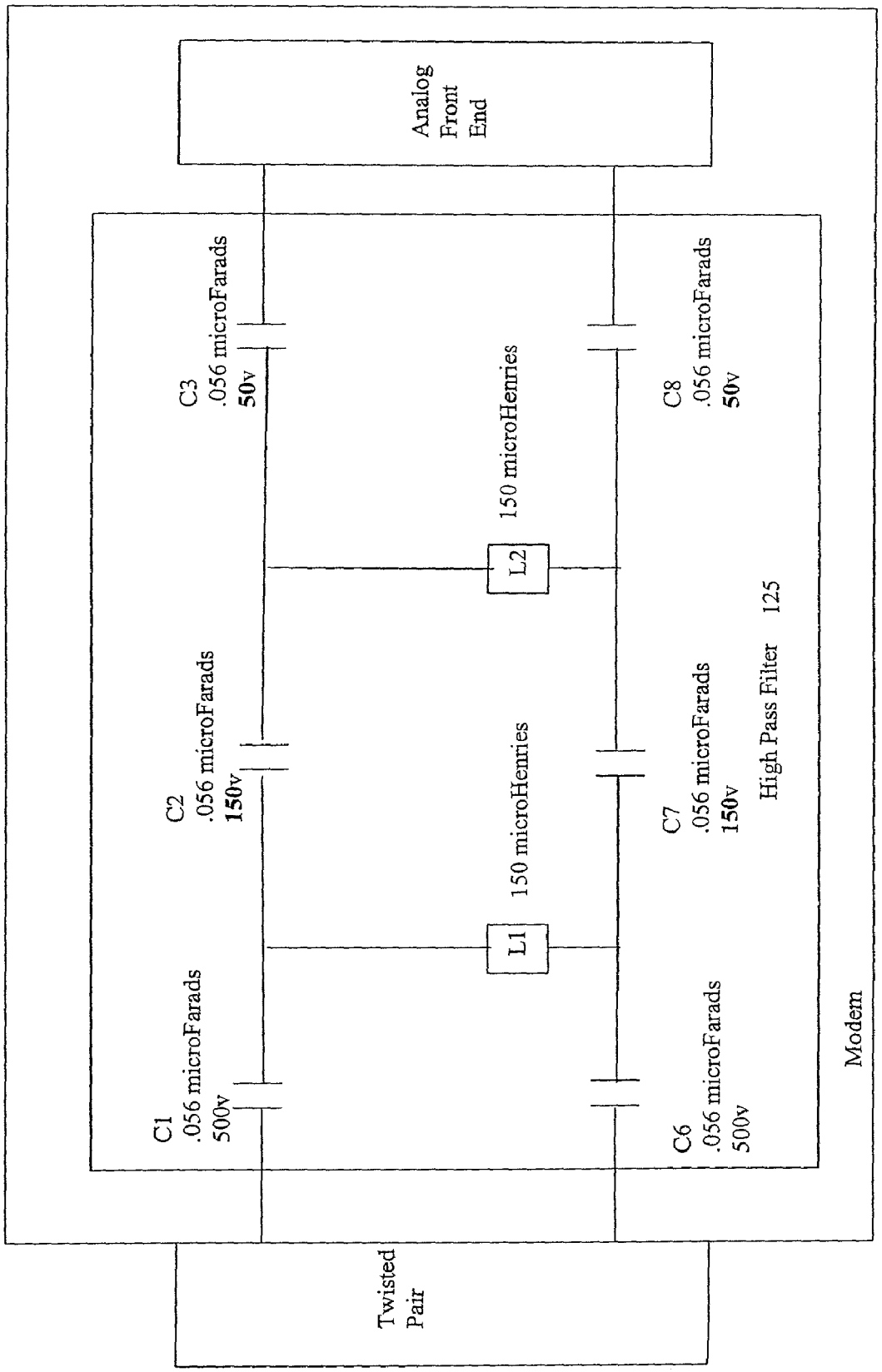
FIG. 13 is a schematic diagram of an embodiment of a lightning insensitive filter.

FIG. 13 is an alternative embodiment of the high pass filter that is insensitive to lightning. The first terminal of the twisted pair is coupled to a first terminal of capacitor C1. A second terminal of C1 is coupled to a first terminal of inductor L1 and a first terminal of capacitor C2. A second terminal of capacitor C2 is coupled to a first terminal of inductor L2 and a first terminal of capacitor C3. A second terminal of capacitor C3 is coupled to a first terminal of an analog front end. A second terminal of the twisted pair is coupled to a first terminal of capacitor C6. A second terminal of capacitor C6 is coupled to a second terminal of inductor L1 and a first terminal of capacitor C7. A second terminal of capacitor C7 is coupled to a second terminal of inductor L2 and a first terminal of capacitor C8. A second terminal of capacitor C8 is coupled to a second terminal of an analog front end. In the embodiment shown C1, C2, C3, C6, C7, and C8 are 0.056 microfarad capacitors Capacitors C1 and C6 have a 500 v breakdown voltage. Capacitors C2 and C7 have a 150 v breakdown voltage. Capacitors C3 and C8 have a 50 v breakdown voltage. Inductor L1 and L2 are both 150 microhenry inductors.

Figure 14:
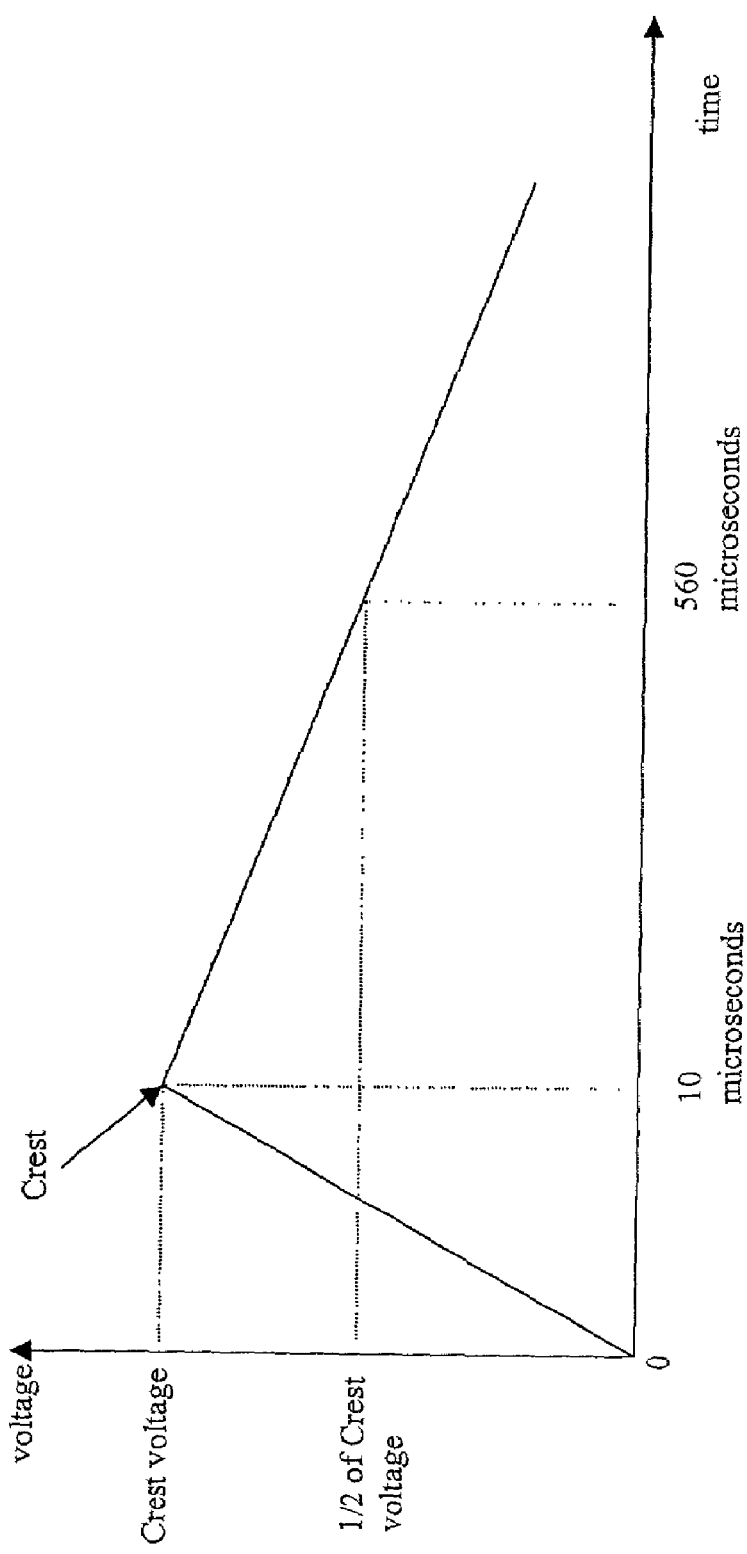
FIG. 14 is a typical lightning profile showing voltage vs. time for a type A or type B lightning profile similar to that used by the FCC.

FIG. 14 is a typical lightning profile showing voltage vs. time for a type A or type B lightning profile similar to that used by the FCC. A type A lightning profile supplies 100 amps of current, and the type B profile provides 25 amps of current. In the profile shown, the voltage reaches a crest value in approximately 10 microseconds. After reaching the value, the voltage falls to half the crest voltage after 560 microseconds. To produce a wave form as shown, a super position of individual frequencies found by performing a Fourier transform will produce a replica of the time based signal. A Fourier component at 100 kilohertz is dominant in producing the profile shown. A large amount of the energy in the lightning profile is thus present at 100 kilohertz frequency.

A filtering circuit is utilized to protect subsequent circuitry against damage from a signal having the time profile shown which can crest at a voltage of up to 800 volts, or 1000 v for type B.

Figure 15:
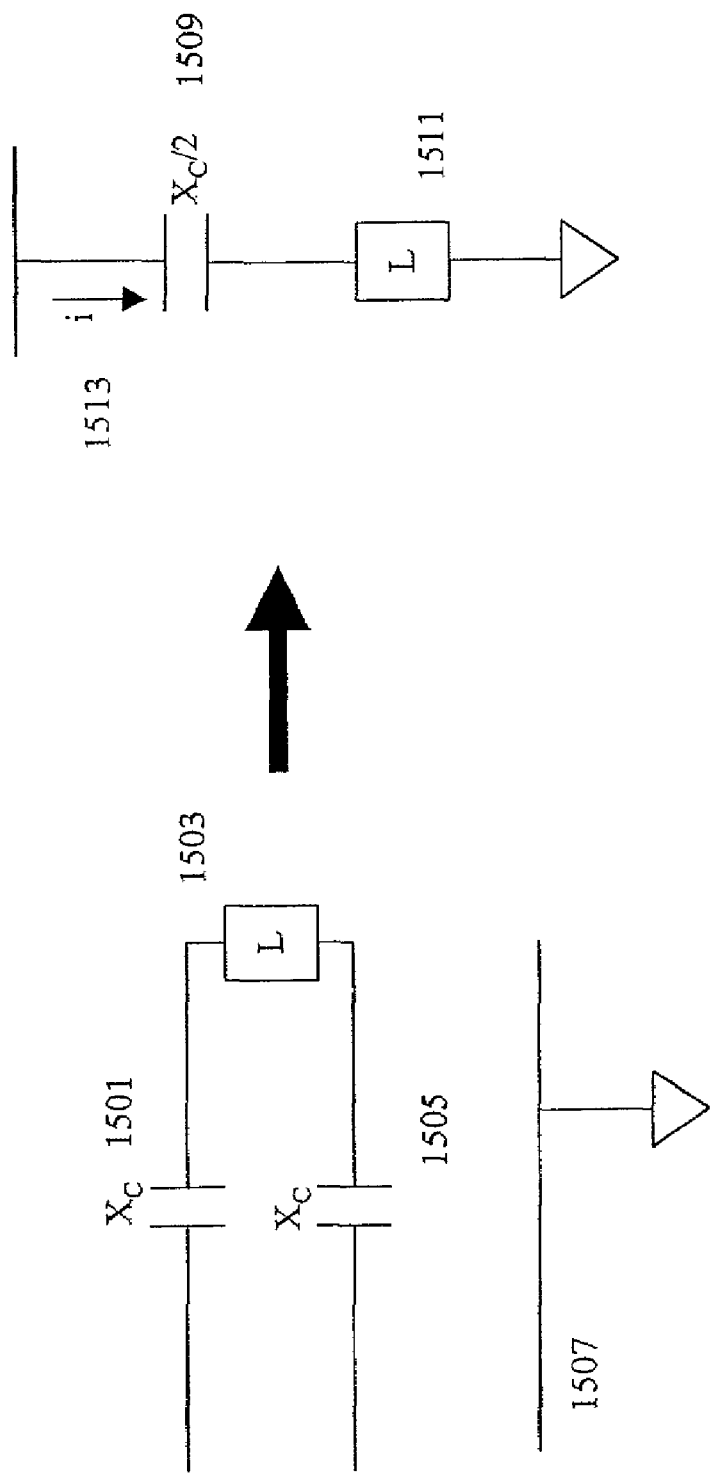
FIG. 15 illustrates a single-ended equivalent circuit implementation of a balanced circuit.

FIG. 15 illustrates a single-ended equivalent circuit implementation of a balanced circuit. In a balanced circuit, often used to interface with a twisted pair transmission line, two series capacitive reactances in series with the balanced lines and an inductance L coupled in parallel across the balanced lines are disposed near the input of an AFE. The circuit 1501, 1505, 1505 is equivalently represented by a series capacitance 1509 having a reactance of $X_C/2$ in series with an inductance L 1511. The opposing terminal of the inductance L is coupled to ground in this single-ended equivalent circuit. The equivalent circuit illustrates the lightning insensitivity of the circuit. As shown in the figure a balanced circuit consists of two transmission lines and a third transmission line that comprises a ground connection.

When lightning is applied to a balanced circuit as shown the circuit behavior may be understood by examining its single ended equivalent circuit. Initially the capacitor having reactance $X_C/2$ has zero voltage across its terminals. At time=0, a nearly infinite current rushes into the capacitor to charge up the capacity and establish a voltage across the capacitor. Inductor L initially resists a change in current having an initial current of 0 Amps. Thus, inductor L will oppose current R rushing into the capacitor. Thus initially zero volts appears across the capacitor and the full voltage of the lightning appears across the inductor. As time progresses, voltage builds across the capacitor tending to reach the final voltage present at the input to the capacitor with the voltage across the inductor decreasing to zero volts as time progresses. By adjusting the reactances the voltage across the capacitor can be made such that it never exceeds its rated breakdown voltage. Thus, the capacitor will never see a voltage close to the full crest voltage of the lightning strike across its terminals if the inrush current is adjusted such that the capacitor reaches its steady state voltage after the crest voltage has passed. Thus, the full crest voltage is never applied across the capacitor. By sharing the voltage present at the crest value of the lightning signal between the series inductor and capacitor in the single-ended equivalent circuit, the full voltage of the lightning signal is never seen across any one component. The single-ended circuit analyzed is thus transformed back into a balanced circuit and used near the input to an AFE to protect the AFE from lightning conducted to the AFE by the twisted pair.

What is claimed is:

1. An analog front end for a digital subscriber line (DSL) modem, the analog front end comprising:
   a single-ended receive channel configured to receive and process a differential input signal from a twisted pair telephone line that has been converted to a single-ended input signal;
   a single-ended transmit channel;
   a converter configured to convert the differential input signal from the twisted pair telephone line to the single-ended input signal for the receive channel, and convert a single-ended output signal from the transmit channel to a differential output signal for transmission on the twisted pair telephone line;
   an automatic gain control amplifier having a single-ended input coupled to the single-ended receive channel, and a single-ended output, wherein the automatic gain control amplifier is configured to receive an automatic gain control signal;
   a single-ended first filter coupled to the automatic gain control output; and
   a single-ended second filter coupled to the transmit channel for filtering the single-ended output signal before conversion to the differential output signal for transmission on the twisted pair telephone line.

2. The analog front end of claim 1, wherein the automatic gain control amplifier comprises a variable attenuator configured to attenuate the single-ended input signal.

3. The analog front end of claim 2, wherein the variable attenuator comprises a voltage controlled resistor.

4. The analog front end of claim 3, wherein the voltage controlled resistor comprises a field effect transistor.

5. The analog front end of claim 4, wherein the field effect transistor comprises a first part coupled to the automatic gain control amplifier, a second part coupled to a bias voltage, and a gate configured to receive a voltage to control the attenuation of the single-ended input signal.

6. The analog front end of claim 5, wherein the first part of the field effect transistor comprises a drain and the second part of the field effect transistor comprises a source.

7. The analog front end of claim 1, wherein the converter comprises a two-way terminal coupled to the receive and transmit channels.

8. The analog front end of claim 1, wherein the converter comprises a transformer having a single secondary winding.

9. The analog front end of claim 8, wherein the secondary winding is grounded at one end.

10. The analog front end of claim 9, wherein the secondary winding comprises a two-way terminal at another end, the two-way terminal being coupled to the receive and transmit channels.

11. The analog front end of claim 1, wherein the receive channel comprises a line driver in combination with a filter.

12. The analog front end of claim 1, wherein the transmit channel comprises a line driver in combination with a filter.

13. The analog front end of claim 1, wherein the receive channel comprises an echo canceller.

14. The analog front end of claim 13, wherein the echo canceller is responsive to the single-ended input signal and the single-ended output signal.

15. The analog front end of claim 14, wherein the echo canceller comprises a comparator configured to compare the single-ended input signal and the single-ended output signal.

16. The analog front end of claim 1, further comprising a filter disposed between the twisted pair telephone line and the converter, the filter having a plurality of components each having a breakdown voltage level sufficient to withstand lightning.

17. The analog front end of claim 16, wherein the plurality of components comprises a plurality of series capacitors and shunt inductors.

18. An analog front end for a digital subscriber line (DSL) modem, the analog front end comprising:
   receive means for receiving a single-ended input signal, the single-ended input signal having been converted from a differential input signal from a twisted pair telephone line;

transmit means for transmitting a single-ended output signal;

converter means for converting the differential input signal from the twisted pair telephone line to the single-ended input signal for the receive means, and converting the single-ended output signal from the transmit means to a differential output signal for transmission on the twisted pair telephone line;

an automatic gain control amplifier means having a single-ended input means coupled to the single-ended receive means, and a single-ended output means, wherein the automatic gain control amplifier means is configured to receive an automatic gain control signal;

a single-ended first filtering means coupled to the automatic gain control means; and a single-ended second filtering means coupled to the transmit means for filtering the single-ended output signal before conversion to the differential output signal for transmission on the twisted pair telephone line.

19. The analog front end of claim 18, wherein the automatic gain control amplifier means comprises variable attenuation means for attenuating the single-ended input signal.

20. The analog front end of claim 19, wherein the variable attenuation means comprises a voltage controlled resistor.

21. The analog front end of claim 20, wherein the voltage controlled resistor comprises a field effect transistor.

22. The analog front end of claim 21, wherein the field effect transistor comprises a first part coupled to the automatic gain control amplifier means, a second part coupled to a bias voltage, and a gate configured to receive a voltage to control the attenuation of the single-ended input signal.

23. The analog front end of claim 22, wherein the first part of the field effect transistor comprises a drain and the second part of the field effect resistor comprises a source.

24. The analog front end of claim 18, wherein the receive means comprises means for amplifying and filtering the single-ended input signal.

25. The analog front end of claim 18, wherein the transmit means comprises means for amplifying and filtering the single-ended output signal.

26. The analog front end of claim 18, wherein the receive means comprises distortion reduction means for reducing distortion.

27. The analog front end of claim 26, wherein the distortion reduction means comprises an echo canceller.

28. The analog front end of claim 26, wherein the distortion reduction means comprises an amplifier having automatic gain control.

29. The analog front end of claim 18, wherein the receive means comprises echo cancellation means for cancelling an echo on the single-ended input signal.

30. The analog front end of claim 29, wherein the echo cancellation means is responsive to the single-ended input signal and the single-ended output signal.

31. The analog front end of claim 30, wherein the echo cancellation means comprises means for comparing the single-ended input signal and the single-ended output signal.

32. The analog front end of claim 18, further comprising a plurality of components disposed between the twisted pair telephone line and the converter means, the components each having a breakdown voltage level sufficient to withstand lightning.

33. The analog front end of claim 32, wherein the components comprises a plurality of series capacitors and shunt inductors.

34. A method of interfacing to a twisted pair telephone line in digital subscriber line (DSL) modem, comprising:

receiving first information, comprising:
receiving a differential input signal from a twisted pair telephone line, where the differential input signal includes the first information;
converting the differential input signal to a single-ended input signal; and
amplifying the single-ended input signal; and
filtering the single-ended input signal;

transmitting second information, comprising:
filtering a single-ended output signal, wherein the single-ended output signal includes the second information;
converting the filtered single-ended output signal to a differential output signal; and
transmitting the differential output signal over the twisted pair telephone line.

35. The method of claim 34, further comprising amplifying the single-ended output signal.

36. The method of claim 34, wherein the amplifying step comprises amplifying the single-ended input signal with automatic gain control.

37. The method of claim 36, wherein the amplifying step comprises attenuating the single-ended input signal.

38. The method of claim 36, wherein the attenuation is performed with a voltage controlled resistor.

39. The method of claim 38, wherein the voltage controlled resistor comprises a field effect transistor.

40. The method of claim 36, wherein the amplifying step is performed with an automatic gain control amplifier, further comprising:

adjusting the gain of the automatic gain control amplifier.

41. The method of claim 34, wherein the receiving first information step further comprising processing the single-ended input signal to reduce distortion.

42. The method of claim 41, wherein the processing is performed with an echo canceller.

43. The method of claim 42, wherein the echo canceller comprises a comparator.

44. The method of claim 34, wherein the receiving first information step further comprising filtering the differential input signal with a plurality of components each having a breakdown voltage level sufficient to withstand lightning.

45. The method of claim 44, wherein the plurality of components comprises a plurality of series capacitors and shunt inductors.

* * * * *

UNITED STATES PATENT AND TRADEMARK OFFICE
CERTIFICATE OF CORRECTION

PATENT NO. : 7,583,797 B2
APPLICATION NO. : 09/901558
DATED : September 1, 2009
INVENTOR(S) : Rahamim et al.

It is certified that error appears in the above-identified patent and that said Letters Patent is hereby corrected as shown below:

Column 18, line 13, please replace "where" with --wherein--.

Column 18, line 16, after "signal;" please remove --and--.

Column 18, line 18, after "signal;" please add --and--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,583,797 B2 Page 1 of 1
APPLICATION NO. : 09/901558
DATED : September 1, 2009
INVENTOR(S) : Rahamim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1418 days.

Signed and Sealed this

Fourteenth Day of September, 2010

David J. Kappos
*Director of the United States Patent and Trademark Office*